United States Patent
Ando et al.

(10) Patent No.: US 8,701,154 B2
(45) Date of Patent: Apr. 15, 2014

(54) INFORMATION MANAGEMENT SYSTEM AND METHOD, CENTER PROCESSING APPARATUS AND METHOD, PROGRAM AND RECORDING MEDIUM USED THEREWITH, AND INFORMATION PROCESSING APPARATUS AND METHOD, AND PROGRAM AND RECORDING MEDIUM USED THEREWITH

(75) Inventors: Kazutaka Ando, Kanagawa (JP); Tetsujiro Kondo, Tokyo (JP); Hideo Nakaya, Kanagawa (JP); Masaaki Hattori, Chiba (JP); Michimasa Obana, Tokyo (JP); Yoshihiro Takahashi, Chiba (JP); Takeyuki Fujii, Tokyo (JP); Yasushi Tatehira, Kanagawa (JP)

(73) Assignee: Sony Corporation, Tokyo (JP)

( * ) Notice: Subject to any disclaimer, the term of this patent is extended or adjusted under 35 U.S.C. 154(b) by 1282 days.

(21) Appl. No.: 12/070,927

(22) Filed: Feb. 22, 2008

(65) Prior Publication Data

US 2008/0209463 A1 Aug. 28, 2008

Related U.S. Application Data

(62) Division of application No. 10/777,890, filed on Feb. 12, 2004.

(30) Foreign Application Priority Data

Feb. 14, 2003 (JP) .................................. 2003-036101
Feb. 14, 2003 (JP) .................................. 2003-036103

(51) Int. Cl.
*H04N 5/217* (2011.01)
*G06K 9/48* (2006.01)
*H04N 7/16* (2011.01)

(52) U.S. Cl.
USPC ............................. 725/139; 382/299; 348/241

(58) Field of Classification Search
None
See application file for complete search history.

(56) References Cited

U.S. PATENT DOCUMENTS

| | | | |
|---|---|---|---|
| 6,169,568 B1* | 1/2001 | Shigetomi | 725/76 |
| 6,172,672 B1* | 1/2001 | Ramasubramanian et al. | 715/720 |
| 6,993,158 B2* | 1/2006 | Cho et al. | 382/103 |
| 7,057,667 B1* | 6/2006 | Mori et al. | 348/554 |
| 2002/0059621 A1* | 5/2002 | Thomas et al. | 725/87 |
| 2003/0133039 A1* | 7/2003 | Kondo et al. | 348/441 |

FOREIGN PATENT DOCUMENTS

| | | |
|---|---|---|
| JP | 2000 196970 | 7/2000 |
| WO | WO 0241630 A1 * | 5/2002 |
| WO | WO 02/059785 | 8/2002 |

* cited by examiner

*Primary Examiner* — Mark D Featherstone
(74) *Attorney, Agent, or Firm* — Frommer Lawrence & Haug LLP; William S. Frommer

(57) ABSTRACT

An information processing apparatus including a user-information analyzing unit which analyzes user information and calculates a variation in parameter. A procedure selecting unit classifies, based on the calculated amount, the user into a predetermined group, and acquires, from a procedure database, a procedure corresponding to the group of the user. A basic part producing unit records, in a product's ROM, various set values. Based on the result of analysis by the user-information analyzing unit, a unique part producing unit records an initial parameter value in the product's ROM. A system controller controls a storage unit to store a characteristic amount extracted by an image-characteristic-amount extracting unit and setting conditions on the image processing which are supplied from a remote control signal receiving circuit so that both are associated to each other.

7 Claims, 26 Drawing Sheets

FIG. 7

```
1    #===power on:Sat Jan 4 10:11:00 2003
2    Channel  6:Sat Jan 4 10:11:03 2003
3    DRCMFv1   164 157:Sat Jan 4 10:11:03 2003
4    Lvolume   124:Sat Jan 4 10:11:25 2003
5    Lvolume   147:Sat Jan 4 10:11:26 2003
6    Lvolume   140:Sat Jan 4 10:15:12 2003
7    Lvolume   147:Sat Jan 4 10:15:15 2003
8    Lvolume   163:Sat Jan 4 10:15:16 2003
9    DRCMFv1   164 154:Sat Jan 4 10:15:20 2003
10   DRCMFv1   164 51:Sat Jan 4 10:15:21 2003
11   DRCMFv1   164 12:Sat Jan 4 10:15:26 2003
12   DRCMFv1   164 54:Sat Jan 4 10:15:27 2003
13   DRCMFv1   162 146:Sat Jan 4 10:15:29 2003
14   DRCMFv1   139 146:Sat Jan 4 10:15:30 2003
15   DRCMFv1   90 146:Sat Jan 4 10:15:31 2003
16   DRCMFv1   5 146:Sat Jan 4 10:15:36 2003
17   DRCMFv1   54 146:Sat Jan 4 10:15:37 2003
18   DRCMFv1   69 146:Sat Jan 4 10:15:41 2003
19   DRCMFv1   72 149:Sat Jan 4 10:15:42 2003
20   DRCMFv1   72 164:Sat Jan 4 10:15:43 2003
21   DRCMFv1   72 239:Sat Jan 4 10:15:46 2003
22   DRCMFv1   72 188:Sat Jan 4 10:15:47 2003
23   DRCMFv1   77 85:Sat Jan 4 10:15:52 2003
24   DRCMFv1   110 85:Sat Jan 4 10:15:54 2003
25   Lvolume   163:Sat Jan 4 10:52:41 2003
26   Channel  8:Sat Jan 4 10:52:41 2003
27   Channel  12:Sat Jan 4 10:52:46 2003
28   Channel  10:Sat Jan 4 10:52:48 2003
29   Channel  8:Sat Jan 4 10:52:51 2003
30   Channel  6:Sat Jan 4 10:52:53 2003
31   Channel  4:Sat Jan 4 10:52:55 2003
32   #===power off:Sat Jan 4 22:46:34 2003
```

FIG. 10

| SELECTED INFORMATION | FREQUENCY-ANALYZED VALUE | | | NOISE ELIMINATION FACTOR | RESOLUTION | ENLARGEMENT RATIO |
|---|---|---|---|---|---|---|
| ×× × | ×× | ×× | ･･･ | ×× | ×× | ×× |
| ･･･ | ･･･ | | | ･･･ | ･･･ | ･･･ |

FIG. 17

| USER CLASSIFICATION NUMBER | TAP | COEFFICIENTS |
|---|---|---|
| 1 | a | $W_{1a}, W_{2a}, W_{3a} \cdots W_{na}$ |
| 2 | b | $W_{1b}, W_{2b}, W_{3b} \cdots W_{nb}$ |
| 3 | c | $W_{1c}, W_{2c}, W_{3c} \cdots W_{nc}$ |

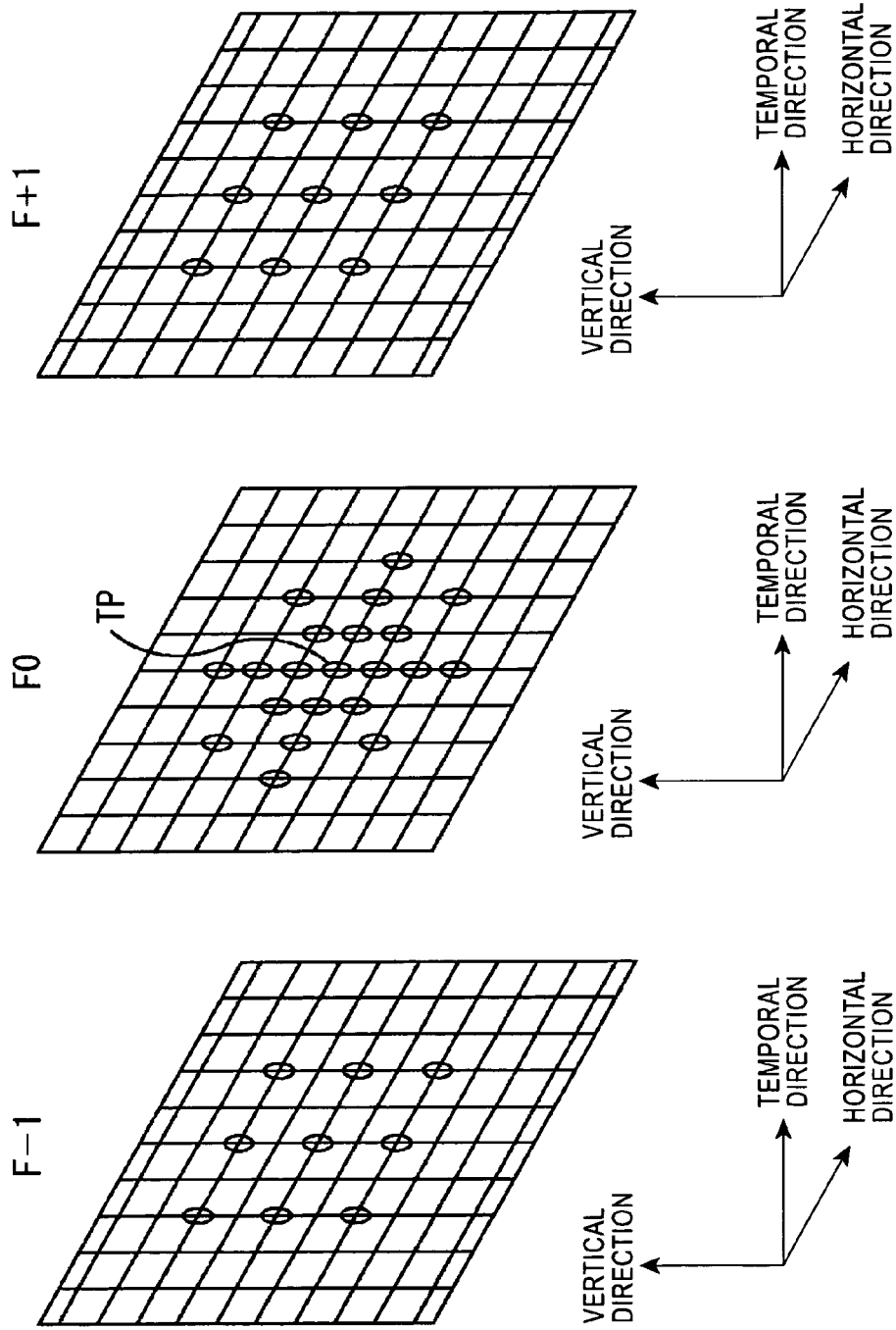

INFORMATION MANAGEMENT SYSTEM AND METHOD, CENTER PROCESSING APPARATUS AND METHOD, PROGRAM AND RECORDING MEDIUM USED THEREWITH, AND INFORMATION PROCESSING APPARATUS AND METHOD, AND PROGRAM AND RECORDING MEDIUM USED THEREWITH

This is a division of application Ser. No. 10/777,890, filed Feb. 12, 2004, which is entitled to the priority filing date of Japanese applications 2003-036101 and 2003-036103, both filed in Japan on Feb. 14, 2003, the entirety of which is incorporated herein by reference.

BACKGROUND OF THE INVENTION

1. Field of the Invention

The present invention relates to information management systems and methods, center processing apparatuses and methods, information processing apparatuses and methods, and programs and recording media used with the information processing apparatuses and methods. In particular, the present invention relates to an information management system and method, a center processing apparatus and method, and an information processing apparatus and method which provide individual users with functions adapted for their preferences, and to a program and recording medium used therewith.

2. Description of the Related Art

In recent years, high performance audio-visual (AV) equipment has been developed in response to growing demands in the AV field. In particular, a television receiver or the like has a function in which various types of image processing are performed based on user's settings and in which image preferences (image quality such as image tone and definition) can be selected by a user. Also, since users' preferences are becoming more diversified, a receiver that analyzes a user's preference and receives content matching the preference has been proposed (e.g., Japanese Unexamined Patent Application Publication No. 2003-224797).

In AV equipment, such as digital videocassette recorders, digital versatile disk (DVD) players, and television receivers, the functions of each piece of equipment are limited. Accordingly, even if a user upgrades the version of only a particular function in one piece of equipment, the user must re-purchase all pieces of equipment. In addition, the above related art has a problem in that functions and products adapted for the preferences of individual users cannot be provided since information about what type of image quality and sound quality each user likes cannot be acquired and analyzed.

SUMMARY OF THE INVENTION

The present invention is made in view of the above circumstances. It is an object of the present invention to enable inexpensive provision of functions and products matching the preferences of individual users.

According to an aspect of the present invention, an information management system is provided which includes a center processing apparatus for performing user-information analysis, and a plurality of information processing apparatuses for storing user information. The center processing apparatus includes an acquiring unit for acquiring user information collected from each of the information processing apparatuses, an analyzing unit for analyzing the user information acquired by the acquiring unit, a user-information recording unit for recording, in a database, the information obtained by the analysis by the analyzing unit, a selecting unit for selecting, based on the user information obtained by the analysis by the analyzing unit, optimal procedures for users of the information processing apparatuses, and a providing unit for providing the users with the optimal procedures selected by the selecting unit. Each of the information processing apparatuses includes an operation-information accepting unit for accepting operation information from the user, a signal processing unit for processing an input signal, based on the operation information accepted by the operation-information accepting unit, and a storage unit for storing, as the user information, the operation information and information concerning the input signal.

According to another aspect of the present invention, a first information processing method for an information management system including a center processing apparatus for performing user-information analysis and a plurality of information processing apparatuses for storing user information is provided. A center processing method for the center processing apparatus includes an acquiring step for acquiring user information collected from each of the information processing apparatuses, an analyzing step for analyzing the user information acquired in the acquiring step, a user-information recording step for recording, in a database, the information obtained by the analysis in the analyzing step, a selecting step for selecting optimal procedures for users of the information processing apparatuses, based on the information obtained by the analysis in the analyzing step, and a provision step for providing the users with the procedures selected in the selecting step. An information processing method for each of the information processing apparatuses includes an operation-information accepting step for accepting operation information from the user, a signal processing step for processing an input signal, based on the operation information accepted in the operation-information accepting step, and a storage step for storing, as the user information, the operation information and information concerning the input signal.

According to an information management system and first information processing method of the present invention, a center processing apparatus acquires user information collected from an information processing apparatus. The acquired user information is analyzed and information obtained by the analysis is recorded in a database. Based on the information obtained by the analysis, optimal procedures are selected for users and are provided to the users. Also, the information processing apparatus accepts operation information from one user. Based on the accepted information, an input signal is processed, and the operation information and information concerning the input signal are stored as user information.

According to another aspect of the present invention, a center processing apparatus for processing user information from a plurality of information processing apparatuses is provided. The processing apparatus includes an acquiring unit for acquiring user information collected from each of the information processing apparatuses, an analyzing unit for analyzing the user information acquired by the acquiring unit, a user-information recording unit for recording, in a database, the information obtained by the analysis by the analyzing unit, a selecting unit for selecting, based on the information obtained by the analysis by the analyzing unit, optimal procedures for users of the information processing apparatuses, and a providing unit for providing the users with the procedures selected by the selecting unit.

Preferably, the selecting unit includes determining unit which calculates a variation in the user information and which determines whether or not the variation is greater than a predetermined threshold, and the selecting unit classifies the users into predetermined groups based on the result of determination by the determining unit.

The center processing apparatus may further include a procedure recording unit in which the optimal procedures are recorded so as to differ depending on the predetermined groups.

The providing unit may include a basic part determining unit which, based on the result of determination by the determining unit, acquires one procedure from the procedure recording unit, and which, based on the acquired procedure, determines a basic part of a function to be provided to the user, and a unique part determining unit which, based on the user information analyzed by the analyzing unit, determines a part unique to the user in the function.

The center processing apparatus may further include an updating unit which, based on the user information recorded by the user-information recording unit, updates the threshold in the determining unit.

According to another aspect of the present invention, a second information processing method for a center processing apparatus for processing user information from a plurality of information processing apparatuses is provided. The information processing method includes an acquiring step for acquiring user information collected from each of the information processing apparatuses, an analyzing step for analyzing the user information acquired in the acquiring step, a user-information recording step for recording, in a database, the information obtained by the analysis in the analyzing step, a selecting step for selecting, based on the information obtained by the analysis in the analyzing step, optimal procedures for users of the information processing apparatuses, and a providing step for providing the users with the procedures selected in the selecting step.

According to another aspect of the present invention, a first program used with a center processing apparatus for processing user information from a plurality of information processing apparatuses is provided. The program includes an acquisition control step for controlling acquisition of user information collected from each of the information processing apparatuses, an analysis control step for controlling analysis on the user information acquired in the acquisition control step, a user-information recording step for recording, in a database, the information obtained by the analysis in the analysis control step, a selection-control step for controlling, based on the information obtained by the analysis in the analysis control step, selection of optimal procedures for users of the information processing apparatuses, and a provision-control step for controlling provision of the procedures selected in the selection-control step to the users.

According to another aspect of the present invention, a first recording medium with a program for a center processing apparatus recorded thereon is provided. The center processing apparatus processes user information from a plurality of information processing apparatuses. The program includes an acquisition control step for controlling acquisition of user information collected from each of the information processing apparatuses, an analysis control step for controlling analysis on the user information acquired in the acquisition control step, a user-information recording step for recording, in a database, the information obtained by the analysis in the analysis control step, a selection-control step for controlling, based on the information obtained by the analysis in the analysis control step, selection of optimal procedures for users of the information processing apparatuses, and a provision-control step for controlling provision of the procedures selected in the selection-control step to the users.

According to a center processing apparatus, second information processing method, and first program of the present invention, user information collected from an information processing apparatus is acquired. Based on information obtained by the analysis, optimal procedures are selected for users and provided to the users.

According to another aspect of the present invention, an information processing apparatus is provided which includes an operation-information accepting unit for accepting operation information from a user, a signal-processing unit for processing an input signal in accordance with a predetermined procedure, based on the operation information accepted by the operation-information accepting unit, and a storage unit for storing, as user information to be provided to a provider of the information processing apparatus, the operation information and information concerning the input signal. The procedure is determined based on past user information of the user.

The storage unit may store, as the operation information, the value of a parameter set by the user and a time that the parameter is set by the user.

The signal processing unit may perform an image creating process by performing classification adaptive processing on an input information signal.

The signal processing unit may be removable from the information processing apparatus.

According to another aspect of the present invention, a third information processing method is provided which includes an operation-information accepting step for accepting operation information from a user, a signal processing step for performing, on an input signal, processing based on the operation information accepted in the operation-information accepting step in accordance with a predetermined procedure, and a storage step for storing, as user information to be provided to a provider of the information processing apparatus, the operation information and information concerning the input signal. The procedure is determined based on past user information of the user.

According to another aspect of the present invention, a second program executed by a computer is provided. The second program includes an operation-information-acceptance control step for controlling reception of operation information from a user, a signal-processing control step for controlling, based on the operation information accepted in the operation-information-acceptance control step, processing on an input signal in accordance with a predetermined procedure, and a storage control step for storing, as user information to be provided to a provider of an information processing apparatus, the operation information and information concerning the input signal.

According to another aspect of the present invention, a second recording medium with a program recorded thereon is provided. The program is executed by a computer and includes an operation-information-acceptance control step for controlling reception of operation information from a user, a signal-processing control step for controlling, based on the operation information accepted in the operation-information-acceptance control step, processing on an input signal in accordance with a predetermined procedure, and a storage control step for storing, as user information to be provided to a provider of an information processing apparatus, the operation information and information concerning the input signal.

According to an information processing apparatus, third information processing method, and second program of the present invention, operation information from a user is accepted. Based on the accepted operation information, an input signal is processed in accordance with a predetermined procedure. The operation information and information concerning the input signal are stored as user information to be provided to a provider of the information processing apparatus.

According to another aspect of the present invention, an information processing apparatus for performing predetermined image processing on an input image is provided. The information processing apparatus includes an extracting unit for extracting a characteristic amount representing the characteristics of the input image, a setting unit for setting conditions on the image processing, an image processing unit for performing the image processing on the input image based on the conditions set by the setting unit, and a storage unit for storing the characteristic amount extracted by the extracting unit and the conditions set by the setting unit so as to be associated with each other.

Preferably, the information processing apparatus may further include a selecting unit for selecting the input image. The storage unit may store selection information concerning the input image selected by the selecting unit, the characteristic amount extracted by the extracting unit, and the conditions set by the setting unit so as to be associated with one another.

The storage unit may provide storage content of the storage unit to a business entity via a network.

The image processing unit may transform the number of pixels or transforms an interlaced image to a progressive image, and may perform the image processing by performing image-quality adjustment in which a resolution and a noise eliminating factor are adjusted or by enlarging the input image at a predetermined enlargement ratio.

According to another aspect of the present invention, an image processing method for performing predetermined image processing on an input image is provided. The image processing method includes an extracting step for extracting a characteristic amount representing the characteristics of the input image, a setting step for setting conditions on the image processing, an image processing step for performing the image processing on the input image based on the conditions set in the setting step, and a storage step for storing the characteristic amount extracted in the extracting step and the conditions set in the setting step so as to be associated with each other.

According to another aspect of the present invention, a recording medium with a program recorded thereon is provided. The program performs predetermined image processing on an input image and includes an extraction-control step for controlling extraction of a characteristic amount representing the characteristics of the input image, a setting-control step for controlling setting of conditions on the image processing, an image-processing control step for controlling execution of the image processing on the input image based on the conditions set in the setting-control step, and a storage-control step for controlling storage of the characteristic amount extracted in the extraction-control step and the conditions set in the setting-control step.

According to another aspect of the present invention, a program for performing image processing on an input image is provided. The program includes an extraction-control step for controlling extraction of a characteristic amount representing the characteristics of the input image, a setting-control step for controlling setting of conditions on the image processing, an image-processing control step for controlling execution of the image processing on the input image based on the conditions set in the setting-control step, and a storage-control step for controlling storage of the characteristic amount extracted in the extraction-control step and the conditions set in the setting-control step.

According to an information processing apparatus and method, and program of the present invention, a characteristic amount representing the characteristics of an input image is extracted, and image processing conditions are set. Image processing based on the set conditions is performed on the input image. The extracted characteristic amount and the set conditions are stored so as to be associated with each other.

BRIEF DESCRIPTION OF THE DRAWINGS

FIG. 7 is an illustration of user information stored in a user-information storage unit;

FIG. 10 is an illustration of storage contents of the storage unit shown in FIG. 8;

FIG. 17 is a table showing a procedure recorded in a procedure database;

FIGS. 20A, 20B, 20C are illustrations of tap position patterns corresponding to user classifications;

DESCRIPTION OF THE PREFERRED EMBODIMENTS

Figure 1:
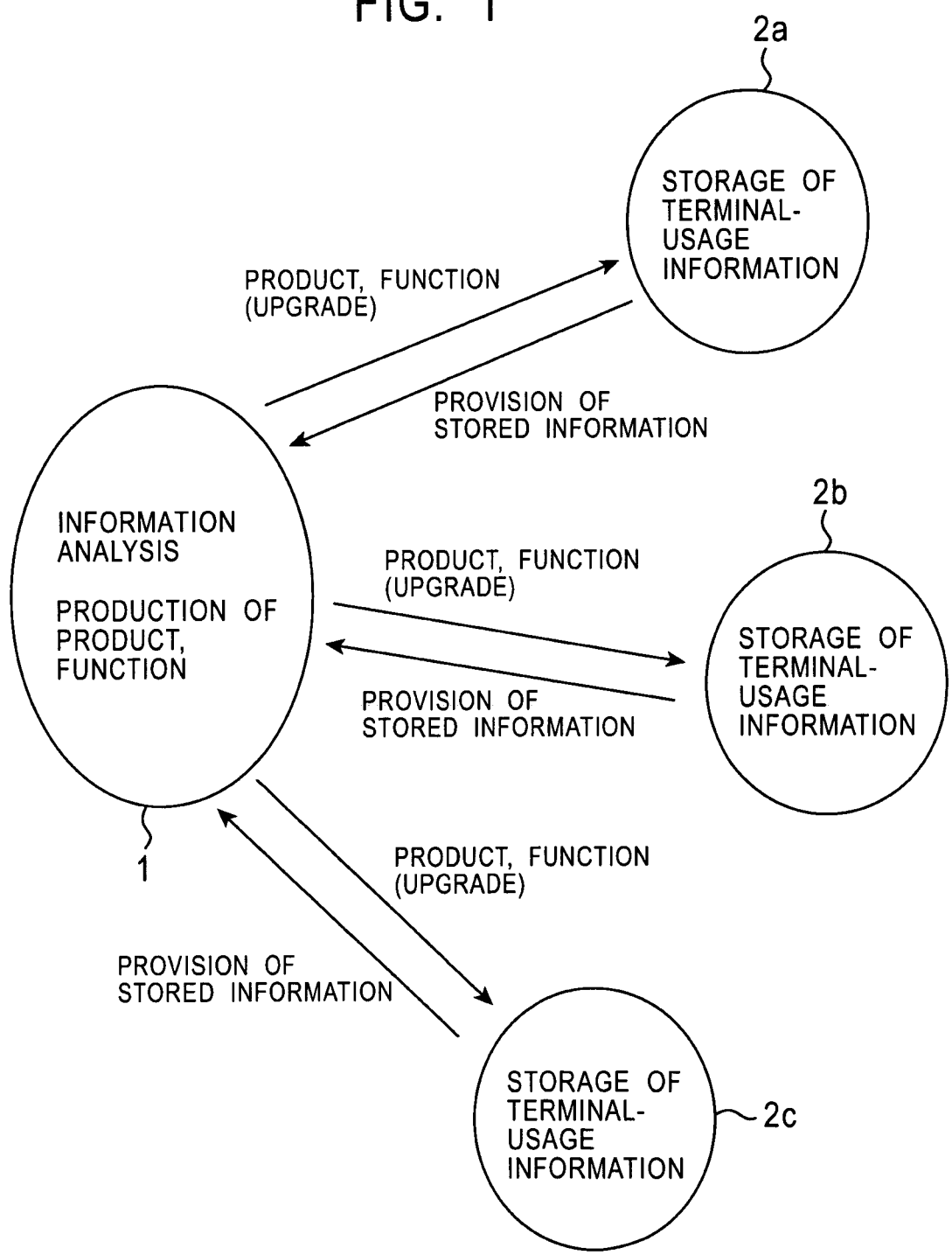
FIG. 1 is an illustration of an example of an information management system to which the present invention is applied.

FIG. 1 shows an embodiment of an information management system to which the present invention is applied. In this embodiment, a center processing apparatus 1 of the present invention is installed in, for example, a center, or the like, of a manufacturer that develops products. The center processing apparatus 1 analyzes user information and produces products or functions. User terminals 2a to 2c which are information processing apparatuses of the present invention are installed in, for example, users' houses and workplaces, etc. When a user of one user terminal uses it, it stores its information, such as operation information and an input signal. Although the embodiment shown in FIG. 1 shows three user terminals, there are actually more user terminals. The configuration of the center processing apparatus 1 is described later with reference to FIG. 11. Also, the configuration of each of the user terminals 2a to 2c is described later with reference to FIG. 3.

Each of the user terminals 2a to 2c provides the center processing apparatus 1 with stored information. Based on the information provided by the user terminals 2a to 2c, the center processing apparatus 1 determines optimal functions for each user terminal, and provides new terminals having the determined functions, as the user terminals 2a to 2c, to the users.

Figure 2:
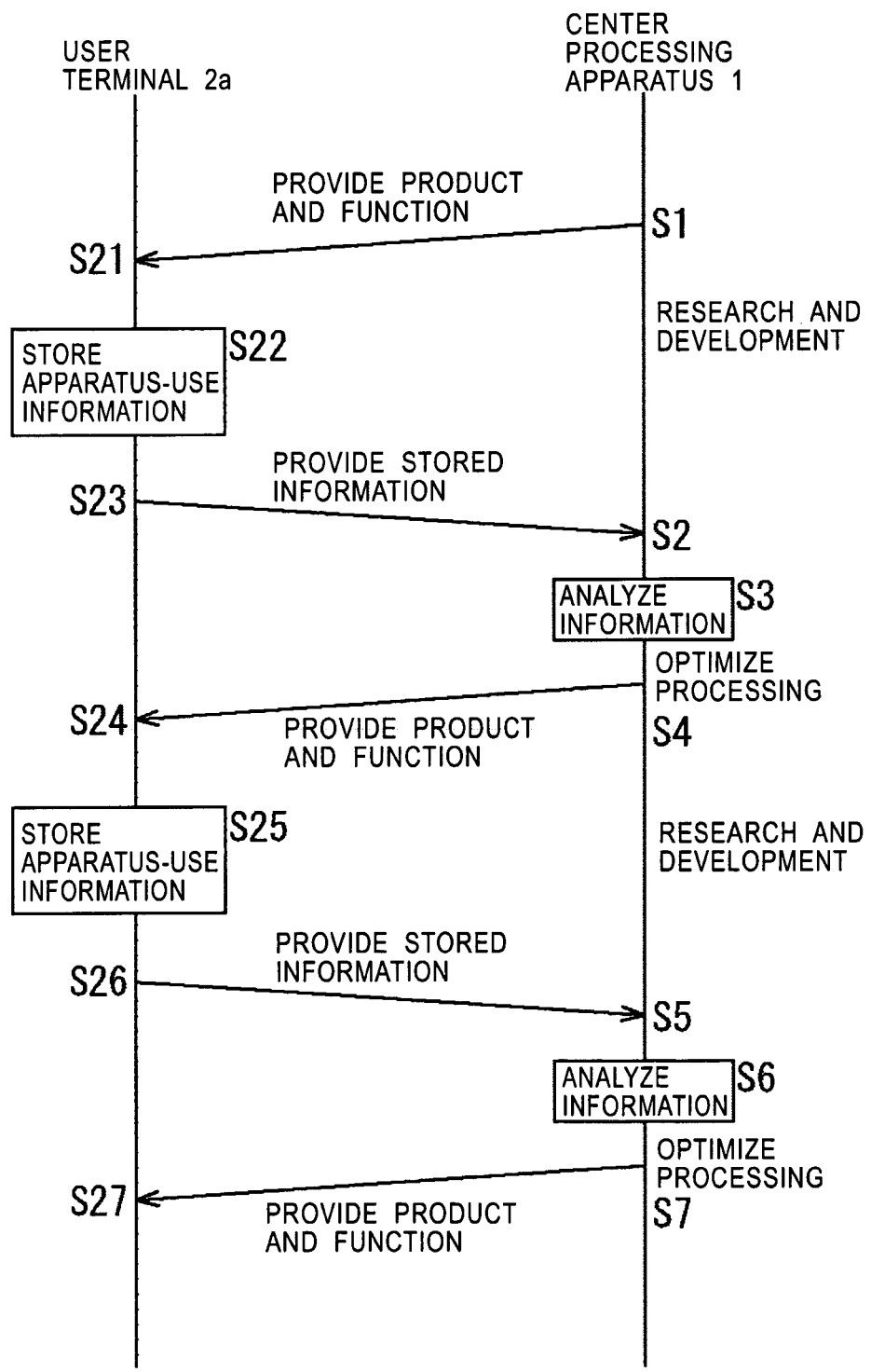
FIG. 2 is a flowchart illustrating a process flow between a center processing adaptive processing and a user terminal.

FIG. 2 is a flowchart showing a process flow between the center processing apparatus 1 and the user terminal 2a.

In step S1, the center processing apparatus 1 provides the user terminal 2a with a produced product having a predetermined function.

In step S21, the user terminal 2a acquires (is equipped with) the provided product. In step S22, when being used by the user, the user terminal 2a accumulates (stores) operation information and an input signal at the use for a predetermined period (e.g., three years). In step S23, the user terminal 2a provides the stored information to the center processing apparatus 1. The provision of the information may be performed by delivering the product, itself, or a part storing the information, etc., from the user to the center processing apparatus 1, or may be performed by transmitting data from the user terminal 2a to the center processing apparatus 1 through a network such as the Internet.

The provision of the information in step S23 may be performed when the information is stored within the predetermined period, or based on an instruction from the center. Also, the provision of the information may be performed at the request of the user.

While the user terminal 2a stores the operation information or the input signal in step S22, the center (manufacturer) performs research and development on a new product or function. The center processing apparatus 1 acquires the information provided by the user terminal 2a in step S2, and analyzes the acquired information in step S3. The center processing apparatus 1 optimizes processing so that the researched and developed new product or function can match preferences of the user of the user terminal 2a. For example, when the result of analyzing the acquired information in step S3 indicates that the user of the user terminal 2a tends to like high resolution images, programs, parameters, etc., of the new product or function are selected so as to be optimal for image-resolution increasing processing.

In step S4, the center processing apparatus 1 produces a product or circuit board to which a new function, that is, a function reflecting the result of the analysis of the user, is added, and provides the product or circuit board to the user.

In step S24, the user terminal 2a acquires the product or circuit board having the new function. When the circuit board is acquired, it is changed for a corresponding circuit board of an existing product, or is newly added. In step S25, when being used by the user, the user terminal 2a stores operation information or an input signal at the use for a predetermined period. In step S26, the user terminal 2a provides the stored information to the center processing apparatus 1.

The provision of the information in step S26 may be performed when the information is stored within the predetermined period, or based on an instruction from the center. Also, the provision of the information may be performed at the request of the user.

While the user terminal 2a stores the operation information or input signal in step S25, the center (manufacturer) performs research and development on a newer product or function (hereinafter referred to as a "next-generation function"). The center processing apparatus 1 acquires the information provided by the user terminal 2a in step S5, and analyzes the acquired information in step S6. The center processing apparatus 1 optimizes processing so that the researched and developed next-generation function can match preferences of the user of the user terminal 2a. For example, when the result of analyzing the acquired information in step S5 indicates that the user of the user terminal 2a tends to like playback of content at a large sound volume, programs, parameters, etc., of the next-generation function are selected so as to be optimal for volume increasing processing.

In step S7, the center processing apparatus 1 incorporates the next-generation function into a circuit board or a new user terminal 2a, and provides the new user terminal 2a to the user. In step S27, the user acquires the new user terminal 2a. Alternatively, when the circuit board is acquired, it is mounted in the existing user terminal 2a.

Although the example in FIG. 2 has described processing between the center processing apparatus 1 and the user terminal 2a, similar processing is performed between the center processing apparatus 1 and the user terminal 2b, and between the center processing apparatus 1 and the user terminal 2c.

When the manufacturer performs product or function development, as described above, the user can acquire an optimized product or function matching the user's preferences.

Figure 3:
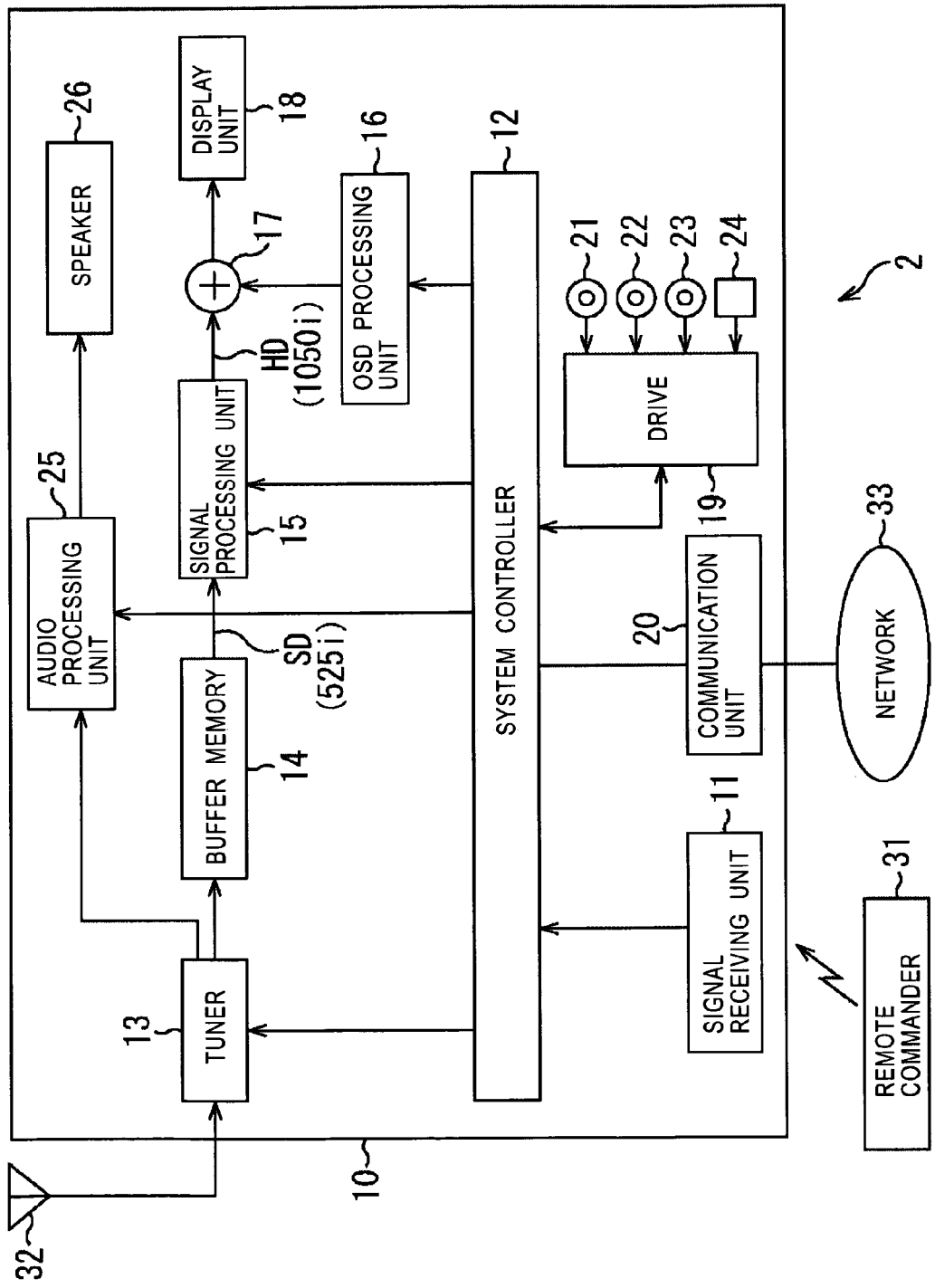
FIG. 3 is a block diagram showing an information processing apparatus of the present invention.

FIG. 3 is a block diagram showing the configuration of each of the user terminals 2a to 2c which is formed by a television receiver or the like. Since the user terminals 2a to 2c are identical in configuration, each of them is hereinafter referred to as the user terminal (television receiver) 2 unless they need to be distinguished. The television receiver 2 has a function of acquiring a standard definition (SD) signal in 525i (interlace) form from a broadcasting signal, converting the 525i signal into a high definition (HD) signal called a "50i signal", and displaying an image based on the HD signal.

The user uses a remote commander 31 to operate the television receiver 2. The television receiver 2 includes a system controller 12 which has a built-in microcomputer including a central processing unit (CPU), a random access memory (RAM), and a read-only memory (ROM), and which controls the operation of the entire system. A signal receiving unit 11, connected to the system controller 12, receives an infrared remote control signal output from the remote commander 31 in response to a user's operation, and supplies the system controller 12 with an operation signal corresponding to the remote control signal.

A receiving antenna 32 receives a broadcasting signal. A tuner 13 is supplied with the broadcasting signal (RF modulated signal) received by the receiving antenna 32. In response to a control signal input from the system controller 12, the tuner 13 performs channel tuning processing that tunes to a channel selected by using the remote commander 31, and obtains an SD signal (525i signal) by further performing intermediate frequency amplifying processing, detecting processing, etc. A buffer memory 14 temporarily stores the SD signal output from the tuner 13.

A signal processing unit 15 is portable and removable from the television receiver 2. For example, a circuit board including the signal processing unit 15, or the like, is formed so as to be relatively easily removed from the television receiver 2. The signal processing unit 15 performs image signal processing that converts the SD signal (525i signal) temporarily stored in the buffer memory 14 into an HD signal (1050i signal).

The user can upgrade the functions of the television receiver 2 by replacing the signal processing unit 15 (circuit board). For example, when a function of performing zooming is developed in future, by changing the existing signal processing unit 15 (circuit board) to a circuit board including a signal processing unit 15 equipped with the function, the user can add the zooming function to the existing functions of the television receiver 2.

An on-screen display (OSD) processing unit 16 generates a display signal for displaying characters and figures on the screen of a display unit 18. A combining unit 17 combines the display signal output from the OSD processing unit 16 with the HD signal output from the signal processing unit 15, and supplies the combined signal to the display unit 18. The display unit 18 is formed by a flat panel display such as a cathode-ray tube display or a liquid crystal display, and displays an image based on the HD signal output from the signal processing unit 15, and an image based on the combined display signal obtained, if required, by the combining unit 17.

The signal output from the tuner 13 is also input to an audio processing unit 25. It is processed (such as volume changing) and a speaker 26 outputs audio based on the processed signal.

The system controller 12 connects to a communication unit 20, and connects to a network 33, if required.

The system controller 12 connects to a drive 19, if required. A magnetic disk 21, an optical disk 22, a magneto-optical disk 23, a semiconductor memory 24, etc., can be loaded into the drive 19. A computer program read from the loaded medium is installed into the system controller 12, if required.

Figure 4:
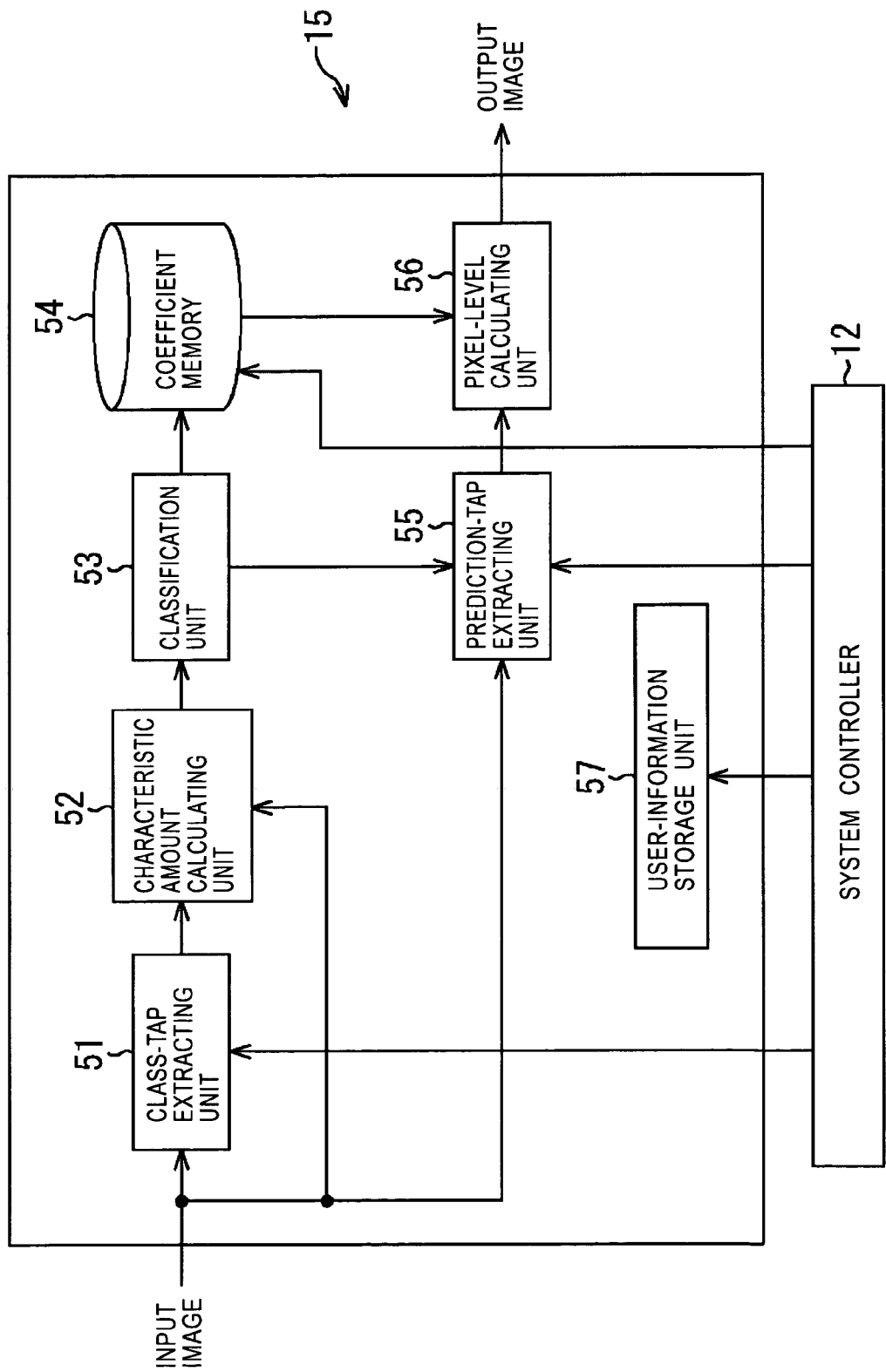
FIG. 4 is a block diagram showing an example of the signal processing unit shown in FIG. 3.

FIG. 4 is a block diagram showing an example of the signal processing unit 15 in FIG. 3. The signal processing unit 15 performs classification adaptive processing, whereby an output image as an HD image is created from an input image as an SD image. Details of the classification adaptive processing are described later.

The signal processing unit 15 includes a class-tap extracting unit 51 for extracting a class tap and a prediction-tap extracting unit 55 for extracting prediction taps. The class-tap extracting unit 51 extracts, from the input image, a class tap which corresponds to a pixel of interest and which is formed by an arbitrary number of pixels at predetermined positions, and supplies the extracted class tap to a characteristic amount calculating unit 52. The characteristic amount calculating unit 52 calculates a characteristic amount of an image corresponding to the pixel of interest, and supplies the characteristic amount to a classification unit 53, with the class tap. The characteristic amount means a motion or a change in in-frame pixel level.

Based on the characteristic amount supplied from the characteristic amount calculating unit 52, the classification unit 53 performs classification for the pixel of interest. The classification unit 53 supplies a coefficient memory 54 and the prediction-tap extracting unit 55 with a class code representing the result of the classification. The classification unit 53 may perform classification only based on a level distribution of the supplied class tap.

The coefficient memory 54 supplies a pixel-level calculating unit 56 with a prediction-tap coefficient corresponding to a class represented by the class code supplied from the classification unit 53.

The prediction-tap extracting unit 55 extracts, from the input image, an arbitrary number of prediction taps at predetermined positions which correspond to the pixel of interest. Based on the prediction taps supplied from the prediction-tap extracting unit 55, and the tap coefficient supplied from the coefficient memory 54, the pixel-level calculating unit 56 calculates the pixel level of the pixel of interest of HD image, and outputs a calculated HD image.

A user-information storage unit 57 stores operation information and an input/output signal. The user-information storage unit 57 is formed by, for example, a nonvolatile memory such as an electrically erasable, programmable read-only memory (EEPROM). Information stored in the user-information storage unit 57 is described later with reference to FIG. 7.

The class-tap extracting unit 51, the coefficient memory 54, and the user-information storage unit 57 are connected to the system controller 12 and is controlled by a control signal output therefrom.

Next, an image-quality adjusting process of the television receiver 2 is described below with reference to FIG. 5.

In step S31, the system controller 12 determines whether the start of the image-quality adjusting process has been commanded, and is on standby until determining that the start of image-quality adjusting process has been commanded. For example, the user presses a predetermined button (not shown) of the remote commander 31, thereby commanding the start of the adjustment. When it is determined in step S31 that the start of the process has been commanded, the system controller 12 proceeds to step S32, and controls the signal receiving unit 11 to receive operation information. Then, the display unit 18 displays, for example, a graphical user interface (GUI) simultaneously controlling resolution and noise suppression. The user simultaneously sets parameters for both by operating the remote commander 31.

Specifically, the user simultaneously sets parameters for both by designating a point on the screen of the GUI in which the resolution and the noise suppression are represented by X and Y axes, respectively.

Figure 6:
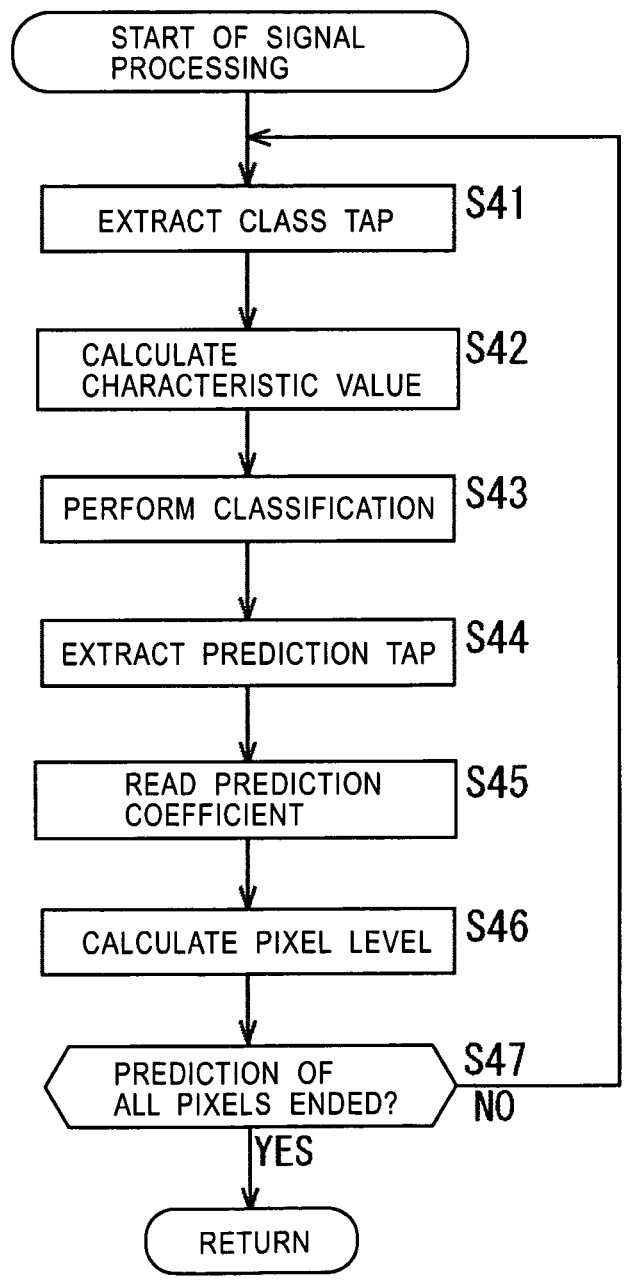
FIG. 6 is a flowchart illustrating the signal processing in step S33 in FIG. 5.

In step S33, the signal processing unit 15 performs signal processing based on the operation information, which is described later with reference to FIG. 6. The signal processing is performed by the classification adaptive processing, as described above.

The classification adaptive processing includes a classification process and an adaptive process. Data items are classified based on their properties, and the adaptive process is performed on each class. The adaptive process uses the following technique.

Specifically, in the adaptive process, for example, a low or standard quality image, that is, an SD image, is mapped by using a predetermined number of tap coefficients (hereinafter referred to as "prediction coefficients", if needed), whereby the SD image is converted into data called a "high quality image", that is, an HD image.

In the case of using a linear combination model as a mapping method using the tap coefficients, the pixel level y of a pixel (hereinafter referred to also as an "HD pixel") included in HD image data is found from a pixel (hereinafter referred to also as an "SD pixel") included in SD image data, by using a plurality of SD pixels extracted as prediction taps for predicting an HD pixel, and the tap coefficients, based on the following linear combination expression:

$$y = \sum_{n=1}^{N} w_n x_n \quad (1)$$

where $x_n$ represents the pixel level of a pixel of the n-th SD image data which is included in a prediction tap for HD pixel y, and $w_n$ represents the n-th tap coefficient by which (the pixel level of) the n-th SD pixel is multiplied. In expression (1), it is assumed that the prediction tap is constituted by N SD pixels $x_1, x_2, \ldots, x_N$.

Here, the pixel level y of the HD pixel can be found not by the linear expression in expression (1) but by a second or higher order expression.

When the true value of the pixel level of an HD pixel of the k-th sample is represented by $y_k$, and a prediction value of the true value $y_k$, obtained by expression (1), is represented by $y_k'$, its prediction error $e_k$ is expressed by the following expression:

$$e_k = y_k - y_k' \quad (2)$$

Prediction value $y_k'$ in expression (2) is found in accordance with expression (1). Thus, replacing $y_k'$ in expression (2) in accordance with expression (1) produces the following expression:

$$e_k = y_k - \left( \sum_{n=1}^{N} w_n x_{n,k} \right) \quad (3)$$

where $x_{n,k}$ represents the n-th SD pixel included in a prediction tap for the HD pixel of the k-th sample.

Although tap coefficient $w_n$, obtained when prediction error $e_k$ is zero, is the optimal for predicting an HD pixel, it is, in general, difficult to find such tap coefficient $w_n$ for all HD pixels.

Accordingly, by using, for example, the least square method as a standard for indicating that tap coefficient $w_n$ is the optimal, the optimal tap coefficient $w_n$ can be found, for example, by minimizing the summation E of squared errors which is represented by the following expression:

$$E = \sum_{k=1}^{K} e_k^2 \quad (4)$$

where K represents the number of sample sets of HD pixel $y_k$ and SD pixels $x_{1,k}, x_{2,k}, \ldots, x_{N,k}$ constituting prediction taps for HD pixel $y_k$.

Tap coefficient $w_n$ minimizing the summation E of the square errors in expression (4) is a value obtained such that a partial differentiation of the summation E with reference to tap coefficient $w_n$ is set to zero. Thus, the following expression must be satisfied:

$$\frac{\partial E}{\partial w_n} = e_1 \frac{\partial e_1}{\partial w_n} + e_2 \frac{\partial e_2}{\partial w_n} + \ldots + e_k \frac{\partial e_{k2}}{\partial w_n} = 0 \quad (n = 1, 2, \ldots, N) \quad (5)$$

Accordingly, by partially differentiating expression (3) with reference to tap coefficient $w_n$, the following expression is obtained:

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k}, (k = 1, 2, \ldots, K) \quad (6)$$

From expressions (5) and (6), the following expression is obtained:

$$\sum_{k=1}^{k} e_k x_{1,k} = 0, \sum_{k=1}^{k} e_k x_{2,k} = 0, \ldots \sum_{k=1}^{k} e_k x_{N,k} = 0 \quad (7)$$

By assigning expression (3) to $e_k$ in expression (7), expression (7) can be expressed by the following normal equation:

$$\begin{bmatrix} \left(\sum_{k=1}^{k} x_{1,k} x_{1,k}\right) & \left(\sum_{k=1}^{k} x_{1,k} x_{2,k}\right) & \cdots & \left(\sum_{k=1}^{k} x_{1,k} x_{N,k}\right) \\ \left(\sum_{k=1}^{k} x_{2,k} x_{1,k}\right) & \left(\sum_{k=1}^{k} x_{2,k} x_{2,k}\right) & \cdots & \left(\sum_{k=1}^{k} x_{2,k} x_{N,k}\right) \\ \vdots & \vdots & \ddots & \vdots \\ \left(\sum_{k=1}^{k} x_{N,k} x_{1,k}\right) & \left(\sum_{k=1}^{k} x_{N,k} x_{2,k}\right) & \cdots & \left(\sum_{k=1}^{k} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{k} x_{1,k} y_k\right) \\ \left(\sum_{k=1}^{k} x_{2,k} y_k\right) \\ \vdots \\ \left(\sum_{k=1}^{k} x_{N,k} y_k\right) \end{bmatrix} \quad (8)$$

The normal equations in expression (8) can be formed as many as the number of tap coefficients $w_n$ to be found. Thus, by solving expression (8) (the left side matrix on tap coefficient $w_n$ must be regular in order to solve expression (8)), optimal tap coefficients $w_n$ can be found. To solve expression (8), for example, a sweeping-out method (Gauss-jordan's elimination), etc., can be employed.

As described above, the adaptive processing is that, by solving expression (8) while using a plurality of HD pixels $y_1, y_2, \ldots, y_K$ as supervising data which is a supervisor for tap coefficient learning, and SD pixels $x_{1,k}, x_{2,k}, \ldots, x_{N,k}$ constituting prediction taps for each HD pixel $y_k$ as learner data in tap coefficient learning, learning for finding the optimal tap coefficient $w_n$ is performed, and subsequently using the tap coefficient $w_n$ in expression (1), SD pixel data is mapped (transformed) to HD pixel data.

The adaptive processing differs from, for example, simple interpolating processing or the like in that a component included in the HD image is reproduced. As far as only expression (1) is concerned, the adaptive processing is identical to interpolating processing using a so-called "interpolation filter". However, a component included in the HD image can be reproduced because tap coefficient $w_n$ corresponding to a tap coefficient of the interpolation filter can be found by learning using HD image data as supervising data and SD image data as learner data. From this point, it may be said that the adaptive processing has a so-called "image creating (resolution creating) operation".

In learning of tap coefficient $w_n$, depending on employment of which combination of supervising data y and learner data x, tap coefficient $w_n$ for various transformations can be found.

Specifically, when HD image data is employed as supervising data y, and SD image data obtained by deteriorating the resolution of the HD image data is employed as learner data x, tap coefficient $w_n$ for transforming an image into another image in which the resolution of the image is increased can be obtained. Also, when HD image data is employed as supervising data y, and SD image data obtained by adding noise or blurring to the HD image data is employed as learner data x, tap coefficient $w_n$ for transforming an image into another image in which the noise or blurring is eliminated can be obtained. In the present invention, based on the latter supervising data y, tap coefficients calculated by learning are stored in the coefficient memory 54 beforehand.

Figure 5:
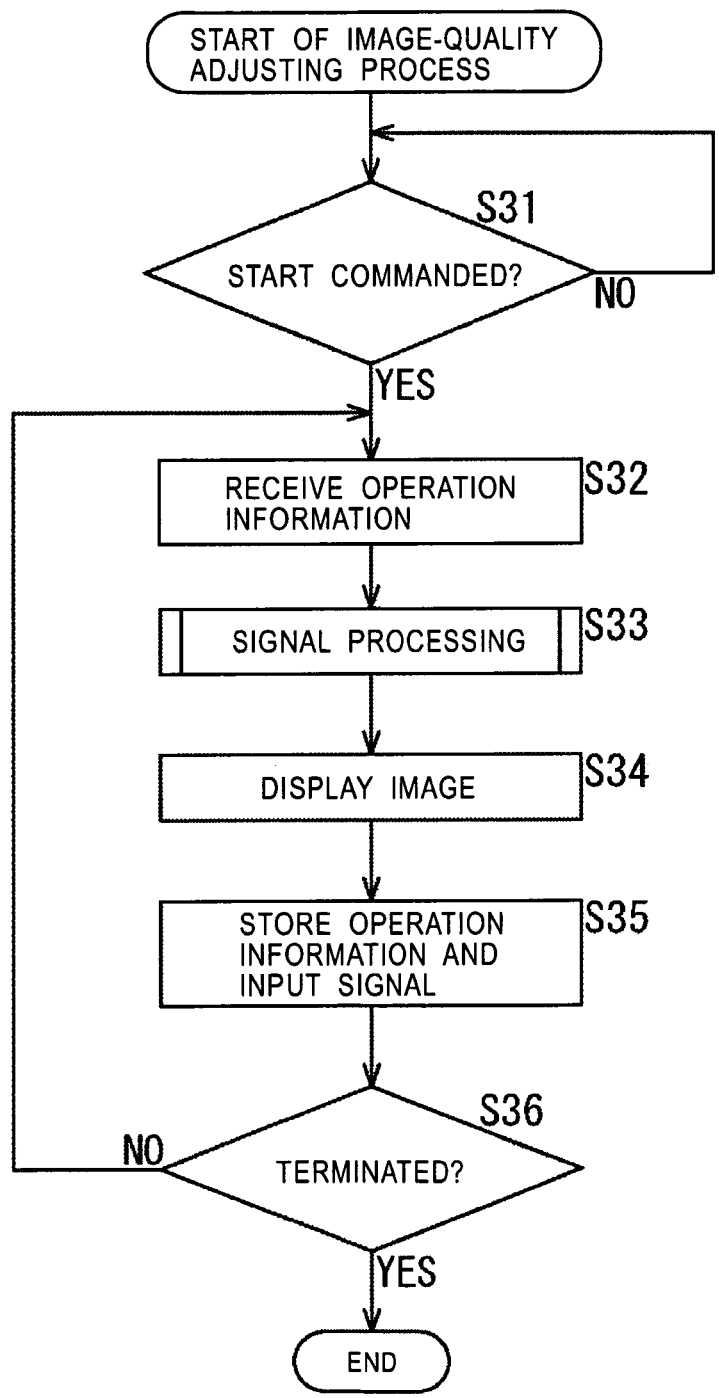
FIG. 5 is a flowchart illustrating an image-quality adjustment process in a television receiver.

The signal processing in step S33 in FIG. 5 is described below with reference to FIG. 6.

In step S41, the class-tap extracting unit 51 extracts, from the input image, a class tap corresponding to a pixel of interest. In step S42, the characteristic amount calculating unit 52 calculates, from the input image, a characteristic amount corresponding to the pixel of interest. In step S43, based on the class tap extracted in step S41 and the characteristic amount calculated in step S42, the classification unit 53 performs classification for the pixel of interest.

In step S44, for the result of the classification in step S43, the prediction-tap extracting unit 55 extracts, from the input image, prediction taps corresponding to the pixel of interest. In step S45, for the result of the classification in step S43, the coefficient memory 54 reads, from the prediction coefficients stored beforehand, a prediction coefficient corresponding to each class obtained by the classification.

In step S46, based on the prediction tap extracted in step S44 and the prediction coefficient read in step S45, the pixel-level calculating unit 56 calculates a pixel level for the pixel of interest. In step S47, the signal processing unit 15 determines whether prediction for all pixels has ended. If the signal processing unit 15 has determined that prediction for all pixels has not ended, it returns to step S41, and repeatedly performs the classification and the adaptive processing, with the next pixel used as a pixel of interest.

In step S47, if the signal processing unit 15 has determined that prediction for all pixels has ended, the process ends.

The signal processing is performed as described above, whereby the SD image is transformed into the HD image, and noise is suppressed to the minimum.

Referring back to FIG. 5, in step S34, the system controller 12 superimposes an OSD signal from the OSD processing unit 16 on the signal output from the signal processing unit 15, and displays, on the display unit 18, an image based on the obtained signal.

In step S35, the system controller 12 stores the operation information and the input signal in the user-information storage unit 57 of the signal processing unit 15. An example of the user information stored is shown in FIG. 7.

In FIG. 7, the first line has the description "#===power on:Sat Jan 4 10:11:00 2003". This indicates that the television receiver 2 was activated at 10:11:00 on Jan. 4 (Saturday), 2003. The second line has the description "Channel 6:Sat Jan 4 10:11:03 2003". This indicates that Channel 6 was selected at 10:11:03 on Jan. 4 (Saturday), 2003.

The third line has the description "DRCMFv1 164 157:Sat Jan 4 10:11:03 2003". This indicates that values 164 and 157 were set as parameters DRCMFv1 for image resolution and noise suppression, respectively. The fourth line has the description "Lvolume 124 Sat Jan 4 10:11:25 2003". This indicates that value 124 was set as parameter Lvolume for sound volume. The fifth line has the description "Lvolume 147 Sat Jan 4 10:11:26 2003". This indicates that value 147 was set as the above parameter Lvolume at 10:11:26 on Jan. 4 (Saturday), 2003. At the sixth to eighth lines, values of parameter Lvolume are similarly described with designated times.

At the ninth to 24th lines, similarly to the third line, values of the above parameters DRCMFv1 are described with designated times. At the 25th line, a value of the above parameter Lvolume is described with a designated time, and at the 26th line to 31st lines, designated channels are described with designated times, similarly to the second line.

The 32nd line has the description "#===power off:Sat Jan 4 22:46:34 2003". This indicates that the television receiver 2 was turned off (powered off) at 22:46:34 on Jan. 4 (Saturday), 2003.

Although the example in FIG. 7 has described the case of storing information after the television receiver 2 was activated at 10:11:00 on Jan. 4 (Saturday), 2003 until it was turned off at 22:46:34 on Jan. 4 (Saturday), 2003, the stored information is not limited to information between the activation and turnoff, but is consecutively stored in accordance with the capacity of the user-information storage unit 57. For example, when the television receiver 2 was activated again at 10:00:00 on Jan. 5 (Sunday), 2003, the description "#===power on:Sun Jan 5 10:00:00 2003" is added to the 33rd line in FIG. 7. After that, the user sets values of various parameters, whereby the information is added similarly to the above case.

The user-information storage unit 57 is configured to have an enough capacity to store the user information for a predetermined period (e.g., three years).

Although the example in FIG. 7 describes the case of storing, not only power-on and power-off, but values of parameters DRCMFv1, parameter Lvolume, and channel values, the stored information is not limited thereto.

Also, the user-information storage unit 57 stores the information in a form to which IDs (e.g., registration numbers) for identifying users are added. When user information is acquired by the center processing apparatus 1, a user is identified based on the user's ID.

Moreover, the user-information storage unit 57 can store the user information in a form associated with the characteristic amount of each image which is obtained when the user designates values of various parameters. The details are described below with reference to FIG. 8.

Figure 8:
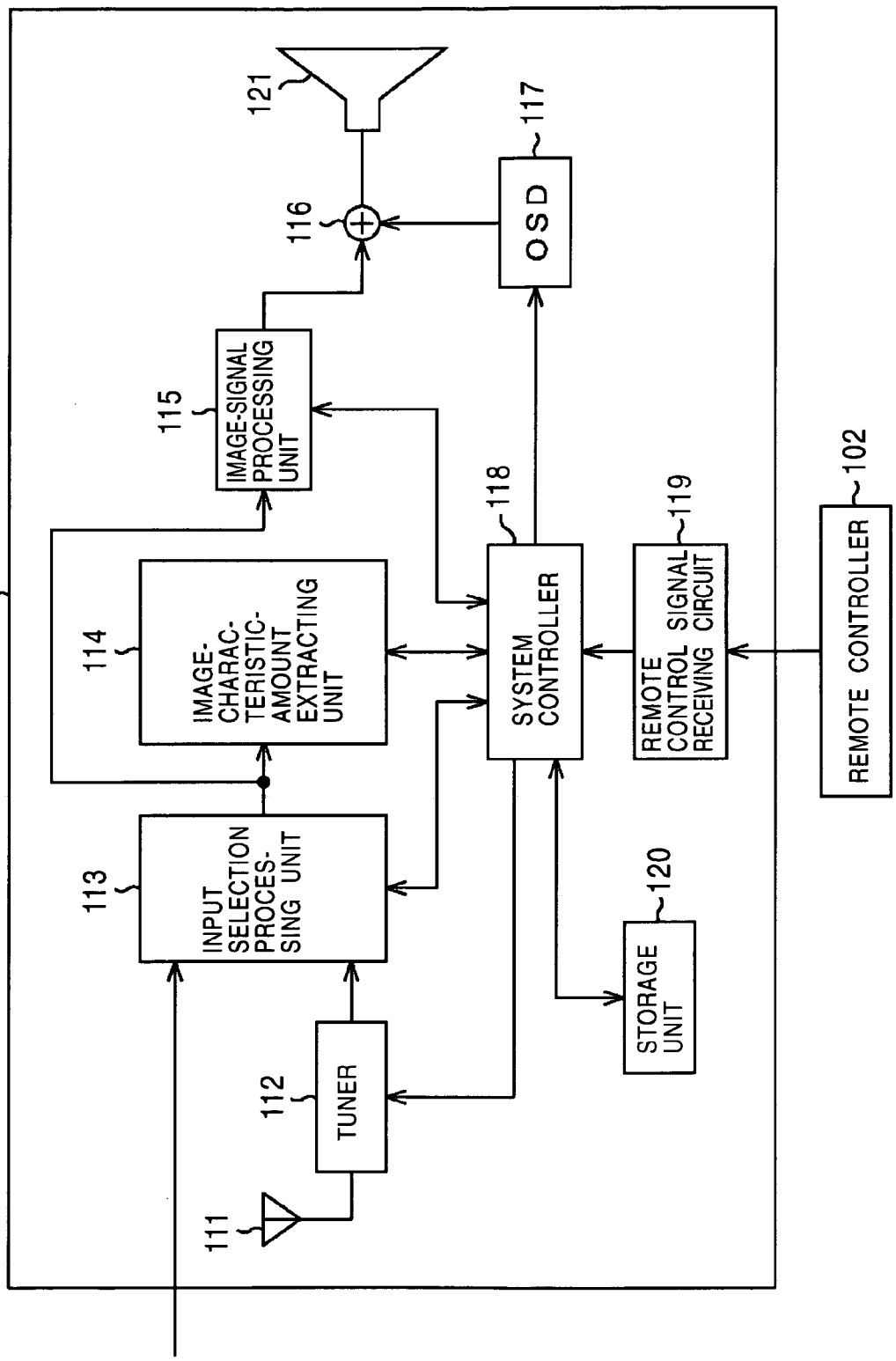
FIG. 8 is a block diagram showing an example of a television receiver to which the case of storing a characteristic amount representing the characteristics of image and various parameters in associated form.

FIG. 8 shows an example of a television receiver 101 to which the above case of storing the characteristic amount of the image in a form associated with various parameters is applied.

In the television receiver 101, a tuner 112 extracts an SD signal by performing processes, such as channel selection, intermediate frequency amplification, and detection, on a broadcasting signal (RF modulated signal) captured by a receiving antenna 111, and supplies the extracted SD signal to an input selection processing unit 113.

Not only the SD signal from the tuner 112, but also an image signal or a digital video signal from a digital versatile disk, a videocassette recorder, or the like (not shown), is input to the input selection processing unit 113.

Under the control of a system controller 118, the input selection processing unit 113 selects a predetermined signal, and performs preprocessing in accordance with the selected signal. The input selection processing unit 113 supplies the resultant image signal to an image-characteristic-amount extracting unit 114 and an image-signal processing unit 115.

The image-characteristic-amount extracting unit 114 extracts, as a characteristic amount of image, the result of frequency analysis on the image signal input from the input selection processing unit 113, the presence of a motion in image, an activity (e.g., dynamic range), or the like, and supplies the extracted characteristic amount to the system controller 118.

Figure 9:
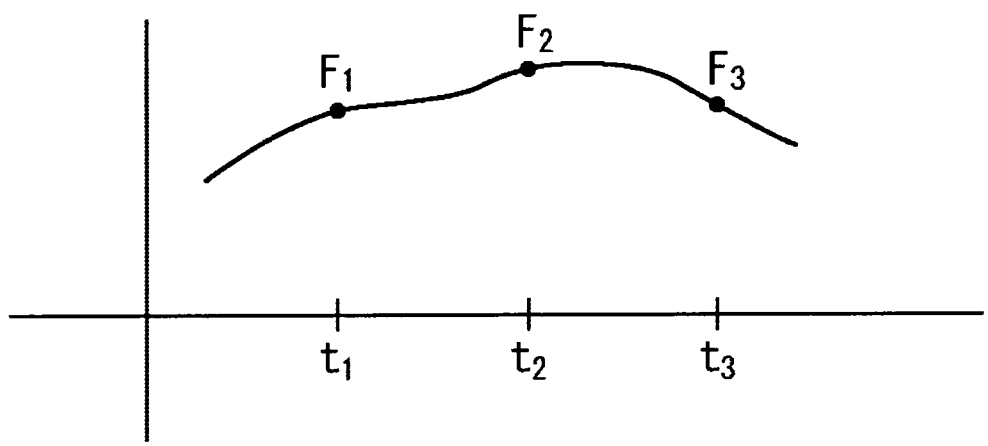
FIG. 9 is a graph showing a frequency analyzing method.

By way of example, the image-characteristic-amount extracting unit 114 treats, as an event, the fact of performing image-quality adjustment (the fact of performing adjustment of resolution and noise elimination in response to a user's operation on a remote controller 102). The image-characteristic-amount extracting unit 114 performs frequency analyses on the image signal at predetermined time intervals (e.g., 1-second intervals) as shown in FIG. 9, and supplies the results (in the case of FIG. 9, $F_1$, $F_2$, $F_3$ ...) to the system controller 118.

The image-signal processing unit 115 has the functions of generating an HD signal (1050i signal or 525p signal) from an SD signal (525i signal), adjusting resolution and noise volume, and zooming which can enlarge part of a displayed image. Accordingly, the image-signal processing unit 115 performs image processing in accordance with functions and conditions set up by the user.

An OSD circuit 117 generates and supplies, to a combining unit 116, a display signal for displaying characters and figures on the screen of a display unit 121. In other words, the combining unit 116 combines the display signal supplied from the OSD unit 117 with the HD signal from the image-signal processing unit 115, and supplies the combined signal to the display unit 121.

The system controller 118 controls the other units in response to a signal supplied from a remote control signal receiving circuit 119, and a signal which represents an input by a user's operation and which is supplied from an operation input unit (not shown) provided, if needed.

For example, the system controller 118 transmits selection signals to the tuner 112 and the input selection processing unit 113, and controls the operation of the OSD circuit 117. Also, the system controller 118 controls a storage unit 120 to store information (hereinafter referred to as "selected information") representing an image on which a user views and listens, such as information (capable of including a broadcast time and a program name) representing a channel selected by the tuner 112, the characteristic amount of image extracted by the image-characteristic-amount extracting unit 114, and image-processing conditions (a tone, a resolution, a noise elimination value, or an enlargement ratio in the zooming function, which is set such that the user operates the remote controller 102) supplied from the remote control signal receiving circuit 119 in associated form.

FIG. 10 shows the storage contents of the storage unit 120. In the example shown in FIG. 10, selected information, frequency-analyzed values, noise elimination factors, and enlargement ratios are stored in the storage unit 120. These data items may also be created for each user ID.

When these data items are stored in the storage unit 120, appropriate data compression can be performed. The data items stored in the storage unit 120 can also be updated, if needed. For example, by deleting old data, only the latest data can be stored in the storage unit 120.

The storage contents of the storage unit 120 can be decoded by a manufacturer that receives the television receiver 101 when it is replaced by purchase. Also, the storage contents of the storage unit 120 can be transferred to the manufacturer.

Referring back to FIG. 5, in step S36, the system controller 12 determines whether the process has been commanded to terminate. If the system controller 12 has determined that the process has not been commanded to terminate, it returns to step S32 and repeatedly executes the subsequent steps. For example, when the user presses a termination button (not shown) of the remote commander 31, the system controller 12 determines in step S36 that the process has been commanded to terminate, and terminates the process.

Figure 11:
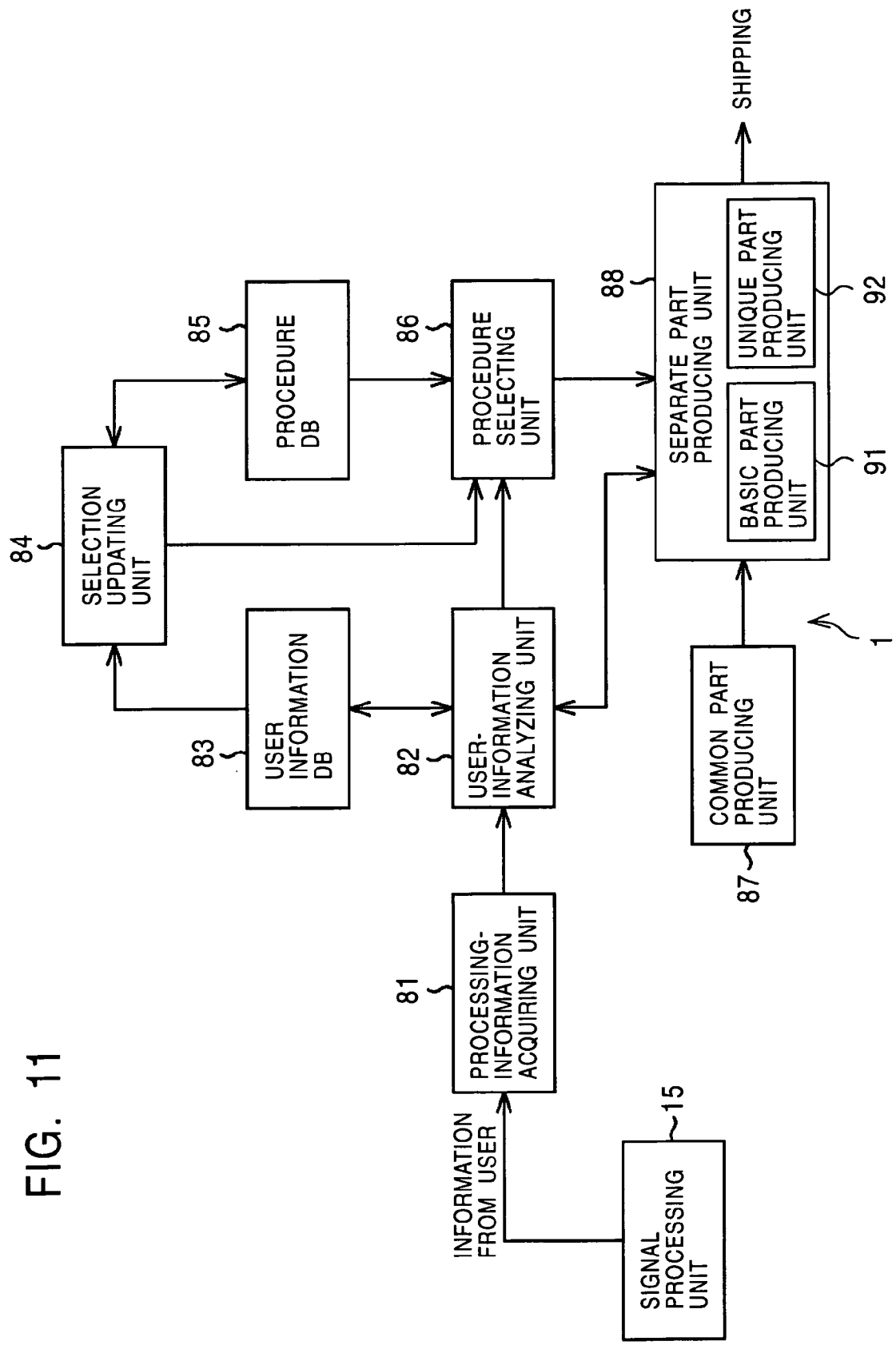
FIG. 11 is a block diagram showing an example of the center processing apparatus.

FIG. 11 is a block diagram showing an example of the center processing apparatus 1. The center processing apparatus 1 includes a user-information (processing-information) acquiring unit 81. User information can be acquired in the center processing apparatus 1, for example, by removing the board of the signal processing unit 15 from the television receiver 2 and delivering the removed board to the center. In this case, the user-information acquiring unit 81 reads the data stored in the user-information storage unit 57.

Alternatively, the user information can be acquired in the center processing apparatus 1 such that, for example, the system controller 12 in the television receiver 2 reads data from the user-information storage unit 57, and transmits the data from a communication unit 20 to the center through a network 33. In this case, the user-information acquiring unit 81 is connected to the network 33, and receives the user information transmitted from the television receiver 2.

The center processing apparatus 1 includes a user-information analyzing unit 82 for extracting a user-identifying ID from the acquired user information and analyzing a change in each parameter in the user information. The analyzed information is recorded in units of users in a user information database (DB) 83. In a procedure database 85, various procedures (e.g., tap positions, coefficients, etc., for use in the classification adaptive processing in the signal processing unit 15) matching users' preferences are recorded. The procedures recorded in the procedure database 85 are updated by a selection updating unit 84, if required.

The center processing apparatus 1 also includes a procedure selecting unit 86 which, based on the information analyzed by the user-information analyzing unit 82, classifies the users into predetermined classes, and which selects the optimal procedure for the user from the procedure database 85. A threshold for use in classification into the predetermined groups is updated by a selection updating unit 84, if required.

The center processing apparatus 1 also includes a common part producing unit 87 for producing common parts for all the users in products or functions to be produced. For example, when the signal processing unit 15 is produced, processes, such as attachment of components constituting the portions of the signal processing unit 15, are performed by the common part producing unit 87. The center processing apparatus 1 also includes a separate part producing unit 88 for producing parts (separate parts) differing depending on the users in the products or functions to be produced. For example, when the signal processing unit 15 is produced, the separate part producing unit 88 performs processing in which various set values are recorded in a ROM (not shown) in the class-tap extracting unit 51, the prediction-tap extracting unit 55, or the coefficient memory 54.

The separate part producing unit 88 includes a basic part producing unit 91 which, based on the procedure selected by the procedure selecting unit 86, produces separate parts for each group, and a unique part producing unit 92 which, based on the information analyzed by the separates parts for each user. For example, when various set values are recorded in the ROM, set values, such as a tap position, coefficients, etc., for use in the classification adaptive processing, are recorded by the basic part producing unit 91, and set values, such as the initial value of image resolution, are recoded by the unique part producing unit 92.

Figure 12:
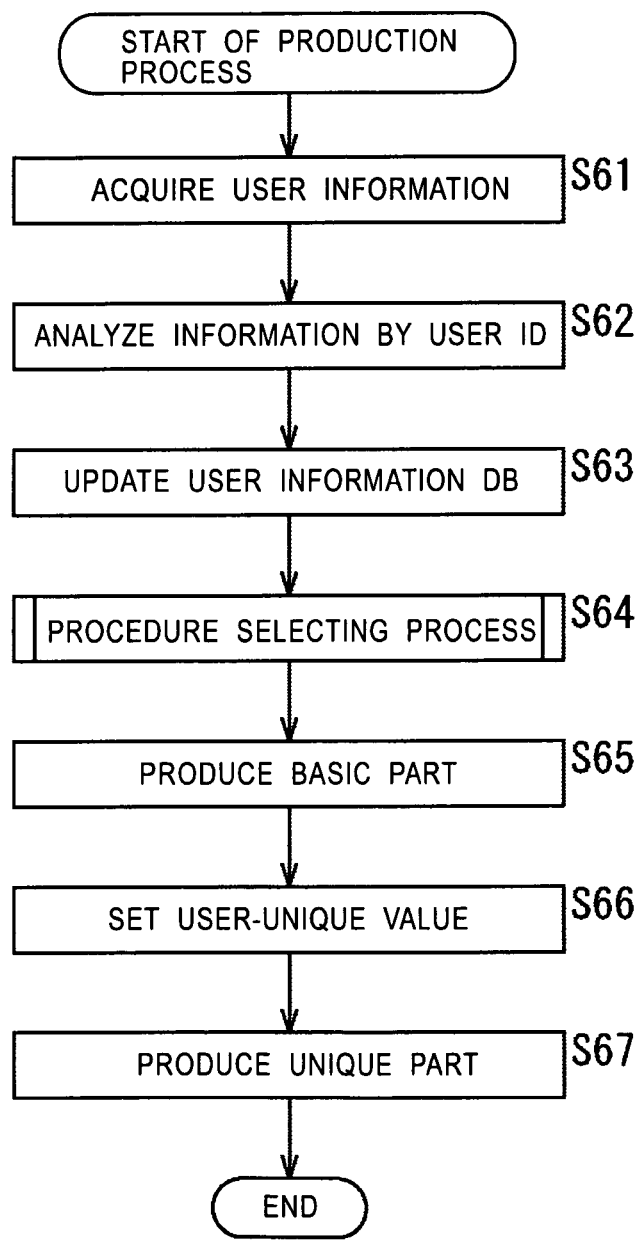
FIG. 12 is a flowchart illustrating a production process for the center processing apparatus.

Next, the producing process for the center processing apparatus 1 is described below with reference to FIGS. 12 and 13.

In step S61, the user-information acquiring unit 81 acquires user information from the user-information storage unit 57 in the signal processing unit 15 for a predetermined user. In step S62, the user-information analyzing unit 82 extracts an ID from the acquired user information, identifies the user, and analyzes the user information for the ID. This produces the analysis results shown in FIGS. 14 to 16.

Figure 14:
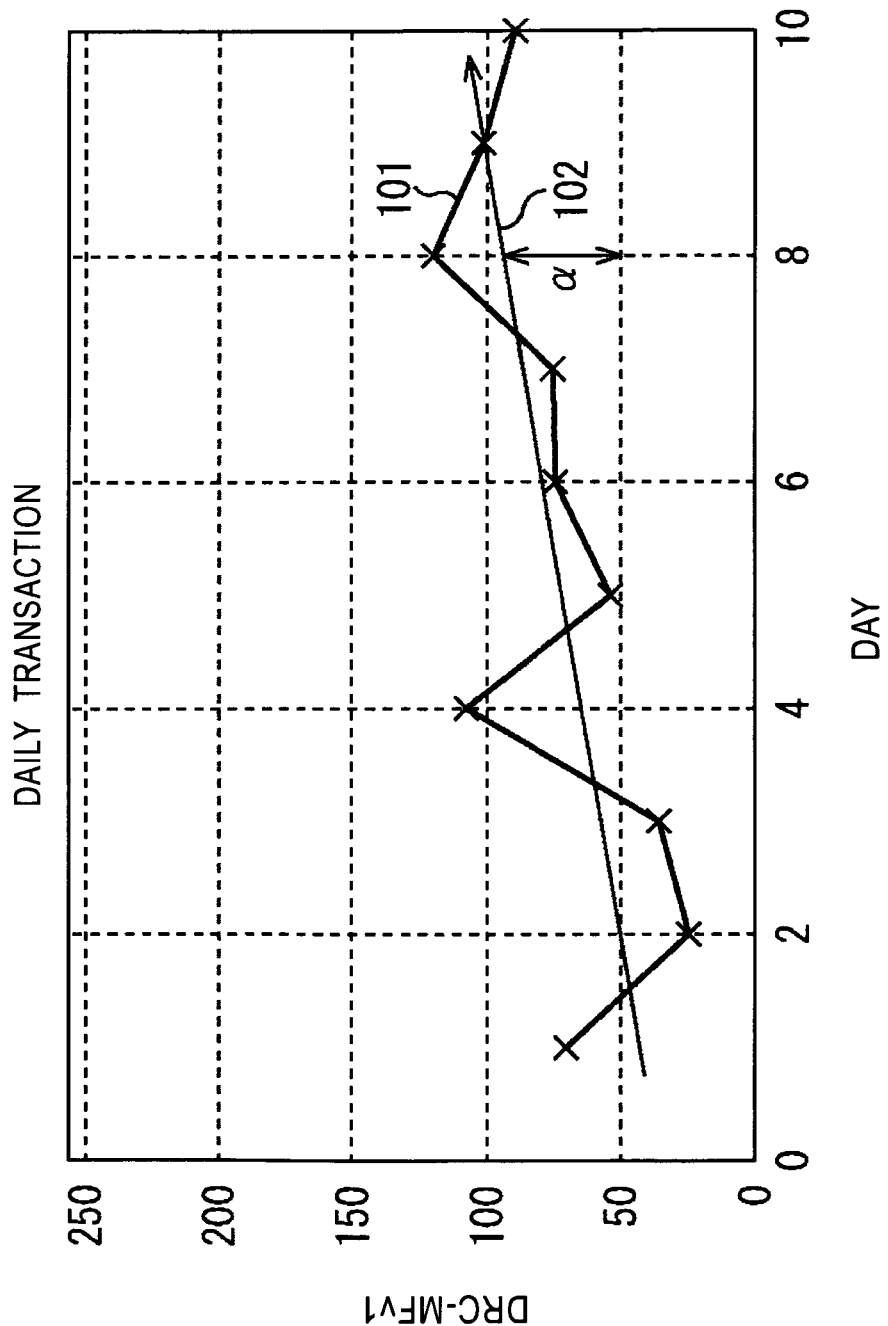
FIG. 14 is a graph showing a user-information analysis result.
Figure 15:
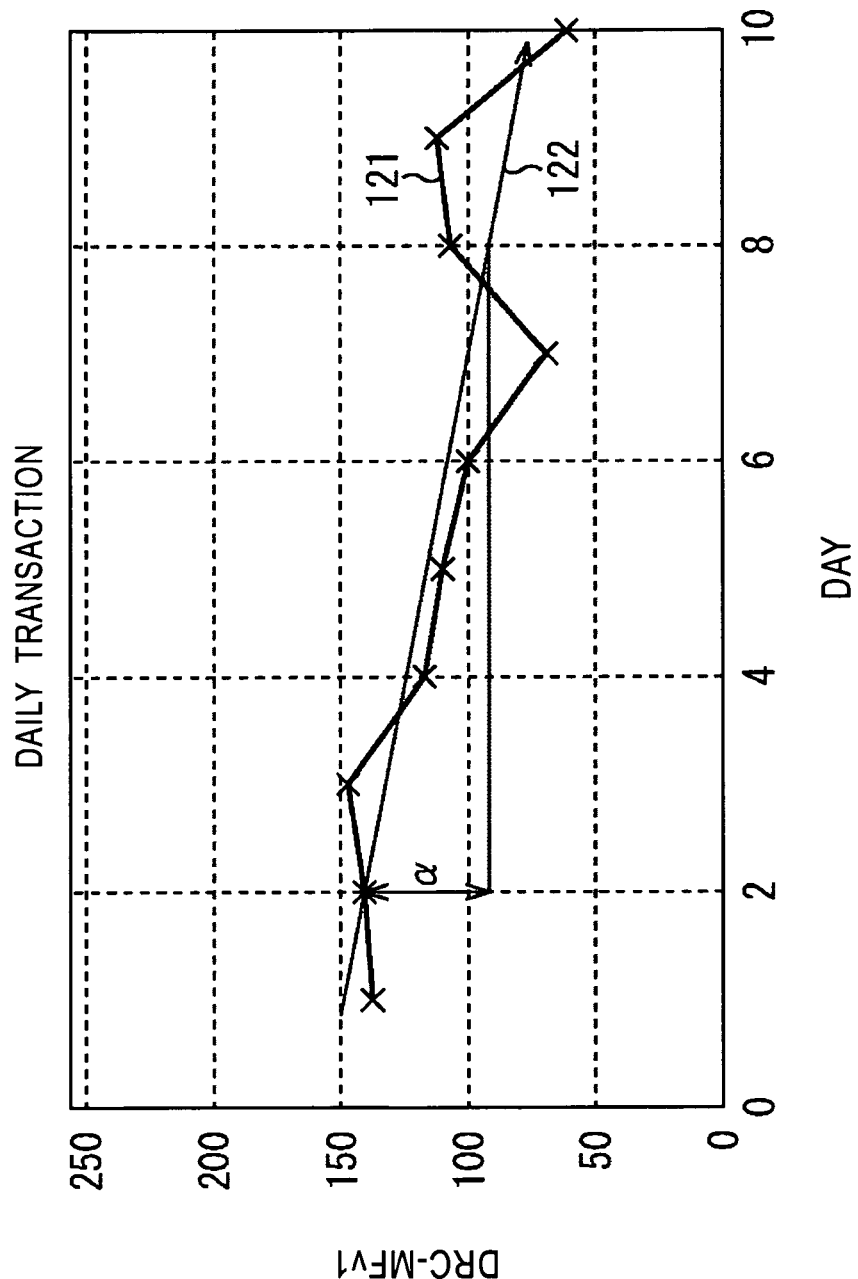
FIG. 15 is a graph showing a user-information analysis result.
Figure 16:
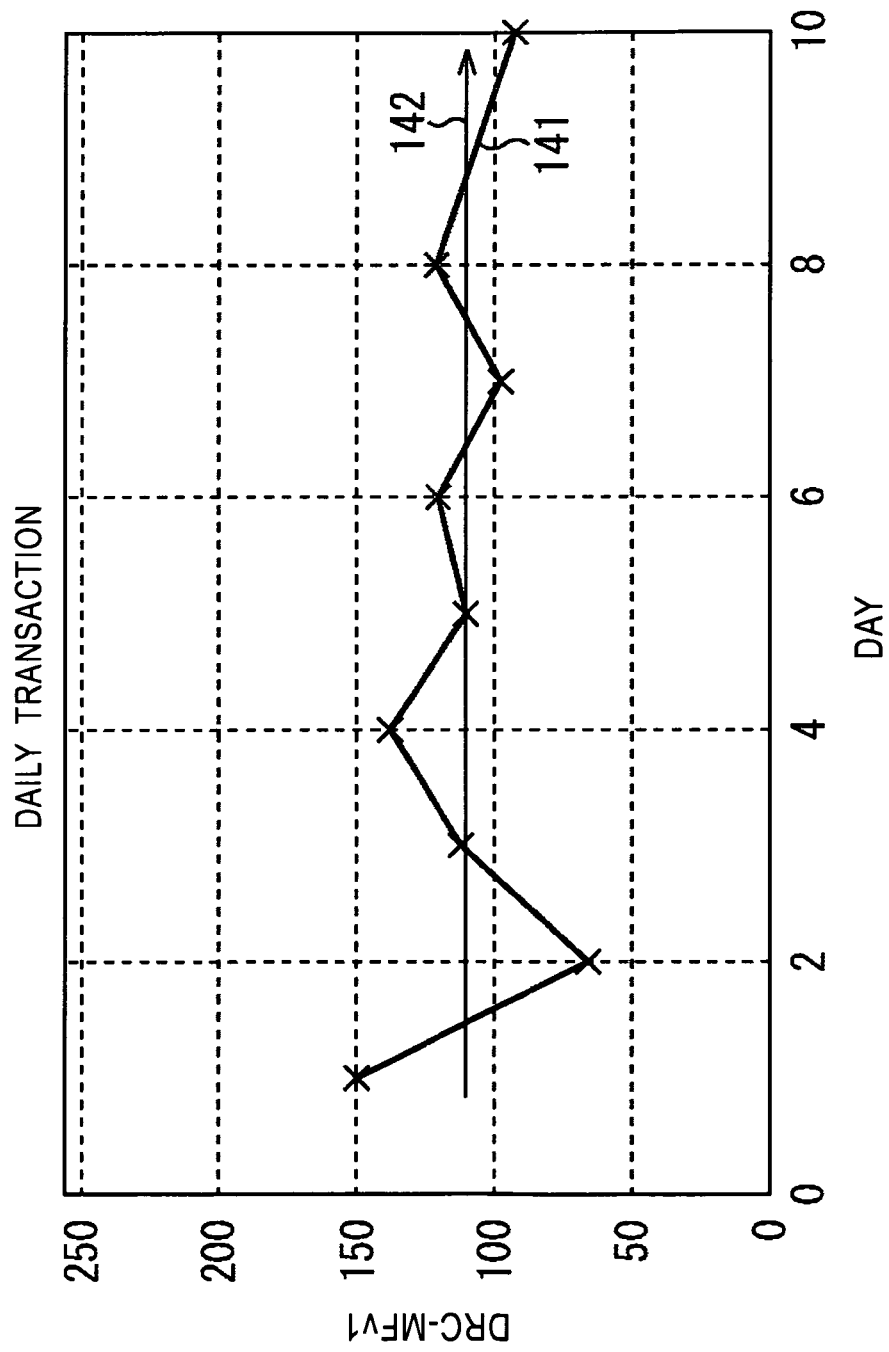
FIG. 16 is a graph showing a user-information analysis result.

Each of FIGS. 14 to 16 is a graph in which its vertical axis indicates values of parameter DRC-MFv1 and its horizontal axis indicates dates. The values of parameter DRC-MFv1 are extracted from the user information. For each date, the average of the values is calculated. The dates on the horizontal axis are calendar days in which the day of initiating acquisition of user information is set as the first day. FIG. 14 is a graph indicating changes in units of days of parameter DRC-MFv1 in the user information of user A, who is the user of the television receiver 2. Similarly, FIG. 15 is a graph indicating changes in units of days of parameter DRC-MFv1 in the user information of user B who differs from user A. FIG. 16 is a graph indicating changes in units of days of parameter DRC-MFv1 in the user information of user C.

The actual parameter DRC-MFv1 consists of two parameter values, resolution and noise. Here, for brevity of description, only the value of resolution is shown.

Values of parameter DRC-MFv1 on the dates are initially plotted to draw the line 101 in FIG. 14. After that, based on the line 101, by using the least square method or the like, the approximate line 102 in FIG. 14 is found. Similarly, also in FIGS. 15 and 16, lines 121 and 141 indicating values of parameter DRC-MFv1 on the dates, and approximate straight lines 122 and 142 therefor are found.

Although the graphs of FIGS. 14 to 16 indicate the analysis results of parameter DRC-MFv1, other parameters (e.g., Lvolume) are similarly analyzed.

In step S63, in the user information database 83, each analysis result in step S62 is recorded with the corresponding ID. This builds a database of user information, thus enabling retrieval of user information by using an ID as a key.

In step S64, the procedure selecting unit 86 performs a procedure selecting process, which is described later with reference to FIG. 13. In the procedure selecting process, the users are classified into predetermined groups and the optimal procedure for each user is selected from the procedure database 85.

The procedure selecting process in step S64 is described with reference to FIG. 13. In step S81, the procedure selecting unit 86 acquires the ID of a user of interest from the user-information analyzing unit 82. In step S82, the procedure selecting unit 86 acquires the corresponding user information from the user-information analyzing unit 82. In step S83, the procedure selecting unit 86 acquires a characteristic amount (e.g., the value of parameter DRC-MFv1) in the user information. At this time, information shown in FIGS. 14 to 16 are acquired.

In step S84, the procedure selecting unit 86 calculates variation $\alpha$ in the characteristic amount. Variation $\alpha$ is calculated in the following manner. For example, when variation $\alpha$ in characteristic amount of user A is found, as shown in FIG. 14, variation a in a predetermined period (e.g., from the 2nd day to the 8th day) on the approximate straight line 102 is calculated. Similarly, variation $\alpha$ in characteristic amount of user B is calculated as shown in FIG. 15. Variation $\alpha$ of user A is a predetermined positive value, while variation $\alpha$ of user B is a predetermined negative value. In the case of user C, the approximate straight line 142 in FIG. 16 is almost in parallel to the horizontal axis, so that variation $\alpha$ in characteristic amount is zero.

In step S85, the procedure selecting unit 86 determines whether the value of variation $\alpha$ is not less than threshold $th_1$. If the procedure selecting unit 86 has determined that the value of variation $\alpha$ is not less than threshold $th_1$ it proceeds to step S86, and sets the user classification number of the user of interest to be 1. The threshold $th_1$ is normally a positive value. Determination of the value of variation $\alpha$ to be not less than $th_1$ is performed when the characteristic amount tends to increase. For example, when the user of interest is user A, the characteristic amount tends to increase, as indicated by the approximate straight line 102 in FIG. 14. Thus, the user classification number of user A is set to 1.

In step S87, the procedure selecting unit 86 acquires, from the procedure selecting unit 86, a procedure corresponding to user classification number 1.

In step S85, when determining that the value of variation $\alpha$ is less than threshold $th_1$, the procedure selecting unit 86 proceeds to step S88 and determines whether the value of variation $\alpha$ is not greater than predetermined threshold $th_2$ ($th_1 > th_2$). If the procedure selecting unit 86 has determined that the value of variation $\alpha$ is not greater than threshold $th_2$, it proceeds to step S89 and sets the user classification number of the user of interest to 2. Threshold $th_2$ is normally a negative value. Accordingly, determination of the value of variation $\alpha$ to be not greater than threshold $th_2$ is performed when the characteristic amount tends to increase. For example, in the case of user B, the characteristic amount tends to increase, as indicated by the approximate straight line 122 in FIG. 15. Thus, the user classification number of user B is set to 2.

In step S90, the procedure selecting unit 86 acquires, from the procedure database 85, a procedure corresponding to user classification number 2.

When it is determined in step S88 that the value of variation $\alpha$ is greater than threshold $th_2$, that is, when the value of variation $\alpha$ is less than threshold $th_1$ and greater than threshold $th_2$, the procedure selecting unit 86 proceeds to step S91, and sets the user classification number of the user of interest to be 3. Determination of the value of variation $\alpha$ to be less than threshold $th_1$ and greater than threshold $th_2$ is performed when the characteristic amount does not tend to increase and decrease. For example, when the user of interest is user C, the characteristic amount does not tend to increase and decrease, as indicated by the approximate straight line 142 in FIG. 16. Thus, the user classification number of user C is set to 3.

In step S92, the procedure selecting unit 86 acquires, from the procedure database 85, a procedure corresponding to user classification number 3.

FIG. 17 shows an example of procedures for groups which are recorded in the procedure database 85. In this example, tap types and coefficients for use in the classification adaptive processing are recorded. FIG. 17 shows a case in which the characteristic amount is the value of parameter DRC-MFv1. However, the procedure is not limited to the case.

If the values of parameters DRC-MFv1 in FIGS. 14 to 16 designate spatial resolutions, a user classified into user classification number 1 is one who likes to set a high spatial resolution. A user classified into user classification number 2 is one who likes to set a low spatial resolution. A user classified into user classification number 3 is one who likes to set an intermediate spatial resolution between the resolutions set by the users classified into user classification numbers 1 and 2.

FIGS. 18A to 18C to FIGS. 20A to 20C show examples of prediction taps in spatial and time domains. The taps shown in FIGS. 18A to 18C, the taps shown in FIGS. 19A to 19C and the taps shown in FIGS. 20A to 20C are called "type-A taps", "type-B taps", and "type-C taps", respectively. In each figure, one circle mark indicates a tap which is selected. The representation F0 represents a field in which there is HD-signal pixel data to be created (pixel data at a position of interest). Field F0 has a center prediction tap TP. The representation F−1 represents a field temporally before field F0, and the representation F+1 represents a field temporally before field F0.

Figure 18C:
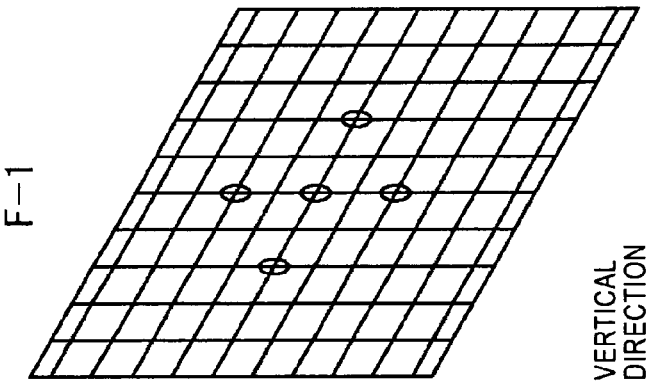
FIGS. 18A, 18B, 18C are illustrations of tap position patterns corresponding to user classifications.
Figure 18B:
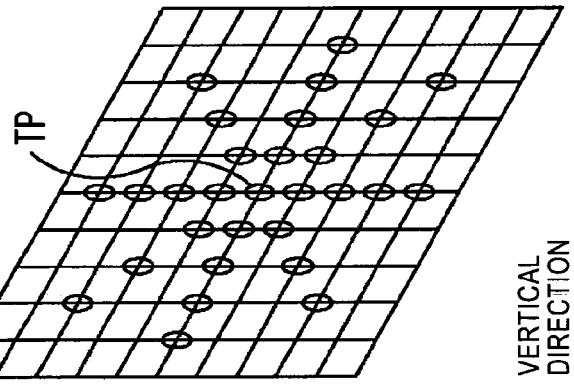
Figure 18A:
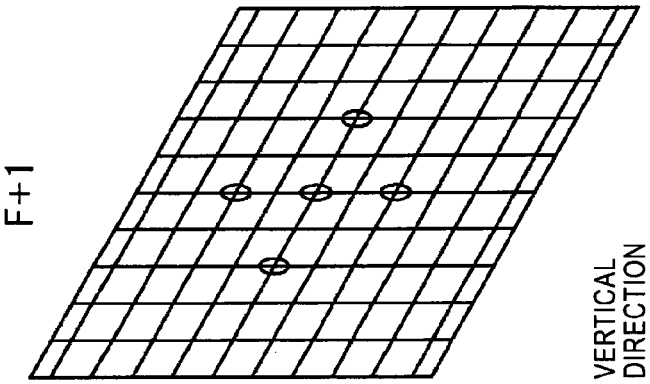
Figure 19C:
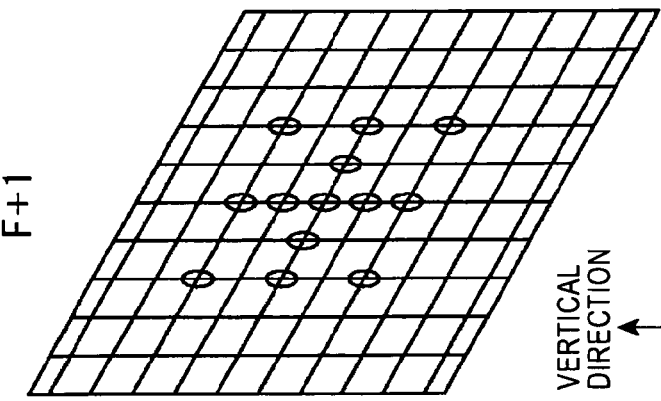
FIGS. 19A, 19B, 19C are illustrations of tap position patterns corresponding to user classifications.
Figure 19B:
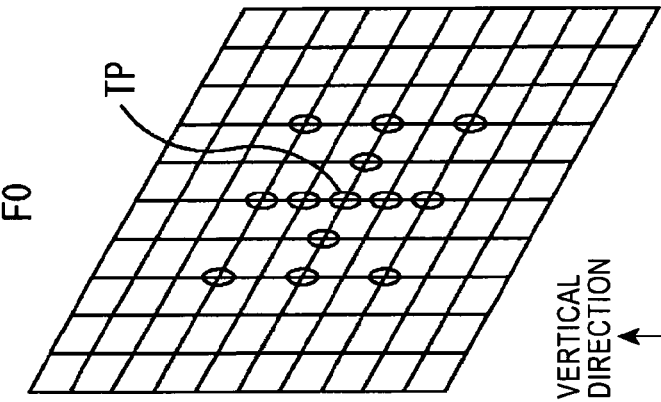
Figure 19A:
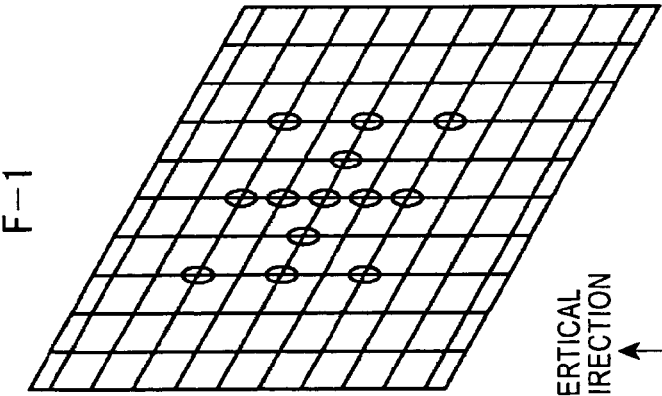

The type-a taps shown in FIGS. 18A to 18C are such that there are more taps in the spatial domain (the vertical and horizontal directions). This generates a spatial resolution more accurate than a temporal resolution. The type-b taps shown in FIGS. 19A to 19C are such that there are more taps in the time domain. This generates a temporal resolution more accurate than a spatial resolution. The type-c taps shown in FIGS. 19A to 19C realize intermediate characteristics between the type-a taps and the type-b taps.

Since the user classified into user classification number 1, for example, user A, is one who likes to set a high spatial resolution, it is preferable for a new signal processing unit 15 to be provided to user A to employ type-a taps. Since the user classified into user classification number 2, for example, user B, is one who likes to set a low spatial resolution, it is preferable for a new signal processing unit 15 to be provided to user B to employ type-b taps. Since the user classified into user classification number 3, for example, user C, is one who likes to set an intermediate spatial resolution between the taps set by the users classified into user classification numbers 1 and 2, it is preferable for a new signal processing unit 15 to be provided to user C to employ type-c taps.

As described above, in the procedure database 85, taps of types corresponding to user classification numbers, and coefficients corresponding to the taps are recorded. In steps S87, S90, and S92 shown in FIG. 13, procedures corresponding to the user classification numbers are selected, whereby each procedure matching the preferences of each user is mounted in a product (function) to be provided to the user.

Referring back to FIG. 12, in step S65, based on the procedure selected in step S64, the basic part producing unit 91 produces a basic part. This records set values, such as taps and coefficients for use in the classification adaptive process, in the ROM. In step S66, the unique part producing unit 92 sets a user-unique value.

Setting of the user-unique value is performed in, for example, the following manner. The approximate straight line 102 in the graph of FIG. 14 rises to the right in FIG. 14. This indicates that user A recently tends to set higher parameter DRC-MFv1 (to set a higher resolution). When a new signal processing unit 15 is provided as a new product (function) to user A, by setting the presently set initial value of parameter DRC-MFv1 to be greater, an image which is more comfortable to user A, that is, an image matching user-A's preferences, can be provided. Accordingly, the unique part producing unit 92 sets the rightist value (110 in the case of FIG. 14) of the approximate straight line 102 as the initial value of parameter DRC-MFv1.

Also, the initial value may be set based on prediction of further values of parameter DRC-MFv1 from the slope of the approximate straight line 102. For example, although FIG. 14 shows up to the 10th day, it is predicted that the value of parameter DRC-MFv1 is approximately 130 on the 12th day because the approximate straight line 102 is inclined to the right in FIG. 14, and can be extended with it unchanged. The thus predicted value can be set as the initial value.

The approximate straight line 122 in FIG. 15 is inclined downward. This indicates that user B recently tends to set lower parameter DRC-MFv1. When a new signal processing unit 15 is provided as a new product (function) to user B, by setting the presently set initial value of parameter DRC-MFv1 to be lower, an image matching user-B's preferences can be provided.

The approximate straight line 142 in FIG. 16 is almost in parallel to the horizontal line. This indicates that user C tends to set higher and lower values of parameter DRC-MFv1. In other words, when a new signal processing unit 15 is provided as a new product (function) to user C, by setting the initial value of parameter DRC-MFv1 to be equivalent to the presently set one, an image matching user-C's preferences can be provided.

Figure 21:
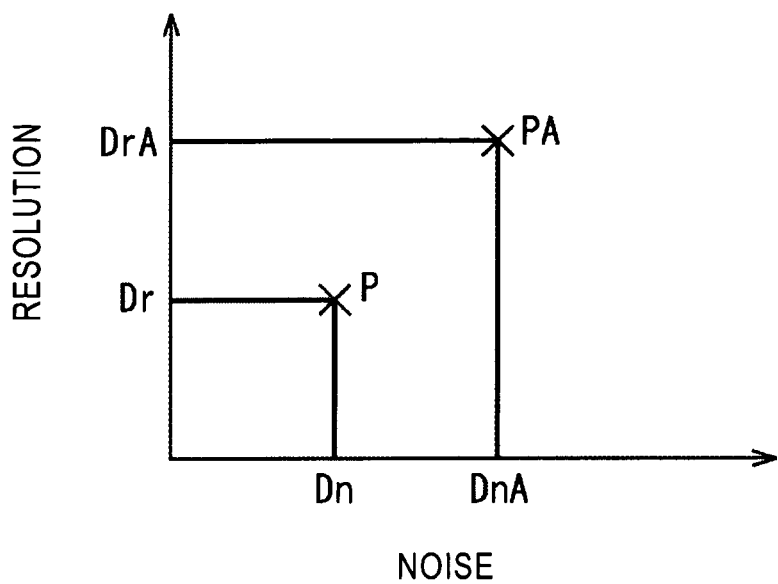
FIG. 21 is a graph showing examples of a resolution and an initial set value of noise.
Figure 22:
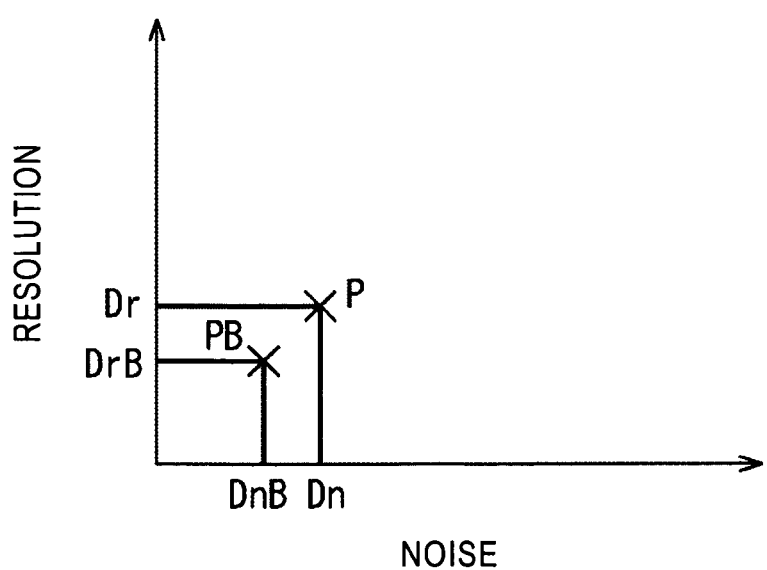
FIG. 22 is a graph showing examples of a resolution and an initial set value of noise.
Figure 23:
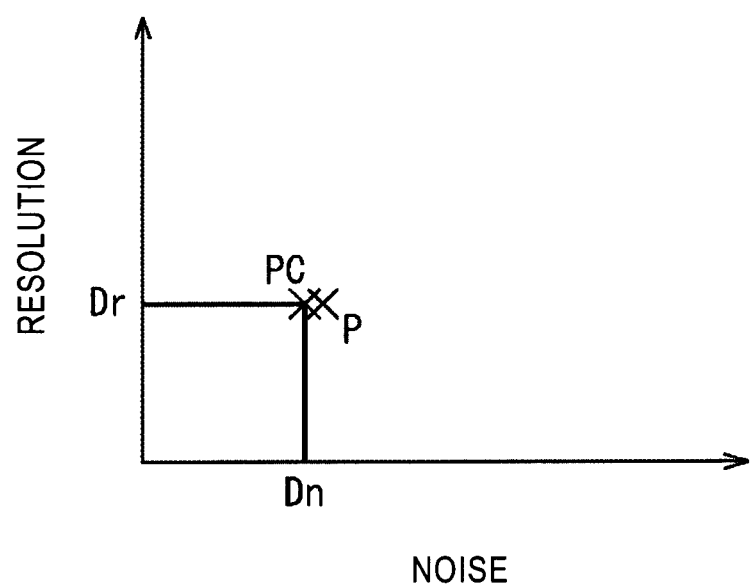
FIG. 23 is a graph showing examples of a resolution and an initial set value of noise.

The initial value of parameter DRC-MFv1, set as described above, is further described with reference to FIGS. 21 to 23. Each of FIGS. 21 to 23 is a graph in which its vertical axis indicates resolution and its horizontal axis indicates noise. Points P shown in FIGS. 21 to 23 each indicate the initial value of the present parameter DRC-MFv1.

In FIG. 21, point PA indicates the initial value of parameter DRC-MFv1 in the new signal processing unit 15 provided to user A. Resolution value DrA corresponding to point PA is set to be higher than resolution value Dr corresponding to point P. Noise value DnA is automatically calculated as an appropriate value by referring to resolution value DrA.

In FIG. 22, point PB indicates the initial value of parameter DRC-MFv1 in the new signal processing unit 15 provided to user B. Resolution value DrB corresponding to point PB is set to be lower than resolution value Dr corresponding to point P.

In FIG. 23, point C indicates the initial value of parameter DRC-MFv1 in the new signal processing unit 15 provided to user C. Point PC is located almost identically to point P.

As described above, for users A, B, and C, different initial values are set. These initial values are not in unit of groups after the users are divided into the groups. One initial value is set for each user.

In step S67, the unique part producing unit 92 produces a unique part. Then, the initial value set in step s66 is recorded in the ROM.

Instead of recording, in steps S65 and S67, in the ROM, set values such as taps and coefficients for use in the classification adaptive process, and an initial value of parameter DRC-MFv1 or the like, the set values such as taps and coefficients for use in the classification adaptive process, and the initial value of parameter DRC-MFv1 or the like, can be transmitted to the television receiver 2 through the network 33. In this case, based on the transmitted data, the system controller 12 of the television receiver 2 updates the values set in the signal processing unit 15.

As described above, the new product (function) matching the preferences of each user is produced.

Figure 13:
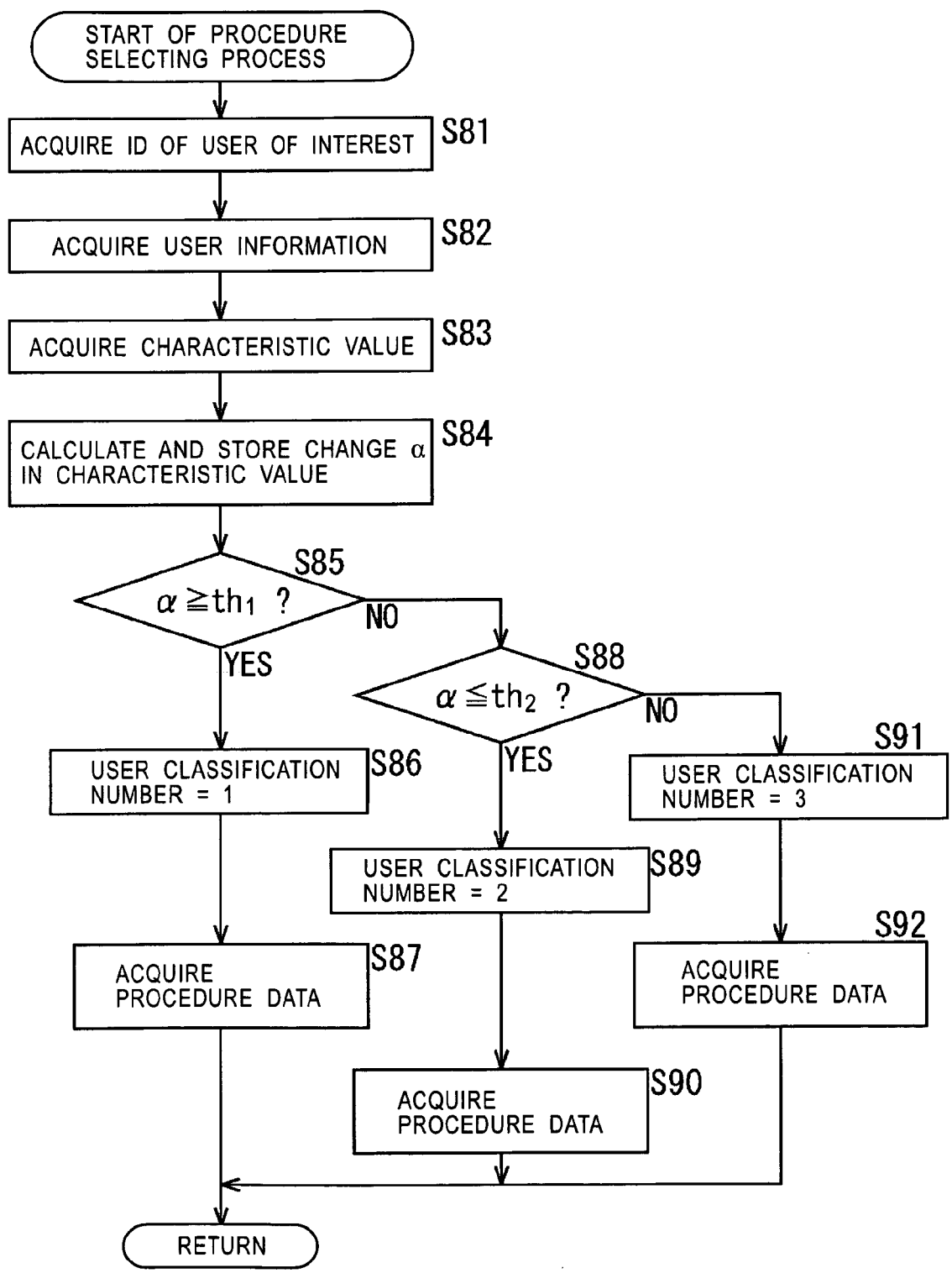
FIG. 13 is a flowchart illustrating the procedure selecting process in step S64 in FIG. 12.
Figure 24:
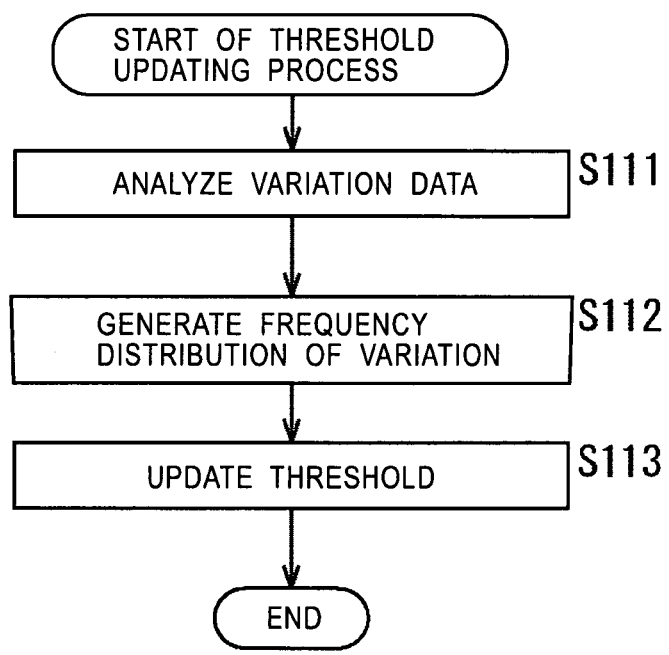
FIG. 24 is a flowchart illustrating a threshold updating process.

In the procedure selecting process shown in FIG. 13, thresholds $th_1$ and $th_2$ in use are updated by the selection updating unit 84, if required. This threshold updating process is described below with reference to FIG. 24. The threshold updating process is performed after the user information is sufficiently stored in the user information database 83. It may be periodically performed. For example, it may be performed whenever a predetermined amount of user information is added.

In step S111, the selection updating unit 84 analyzes the variation data recorded in the user information database 83. In step S112, the selection updating unit 84 generates a variation frequency distribution.

Figure 25:
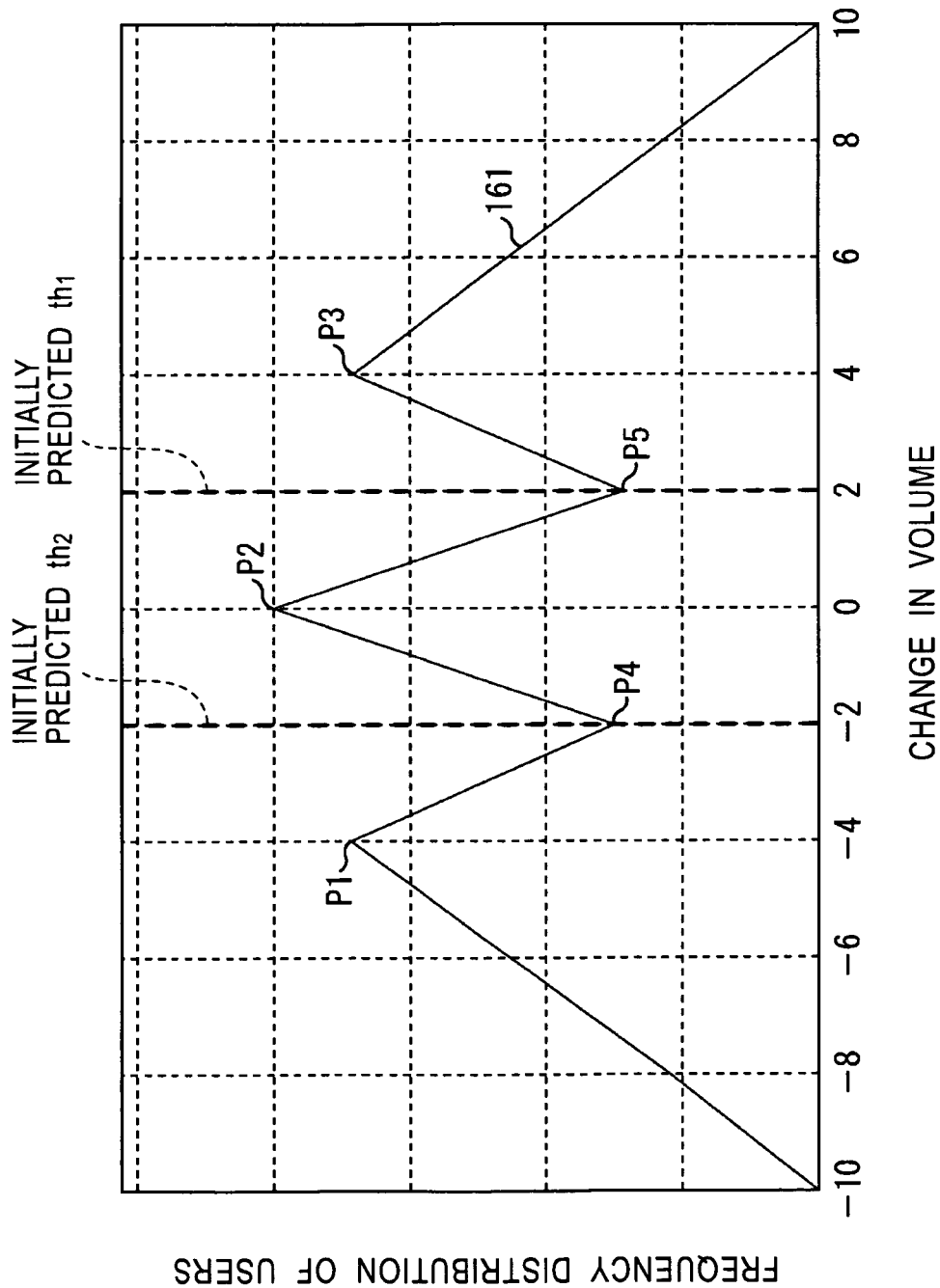
FIG. 25 is a graph showing the frequency distribution of characteristic amounts.
Figure 26:
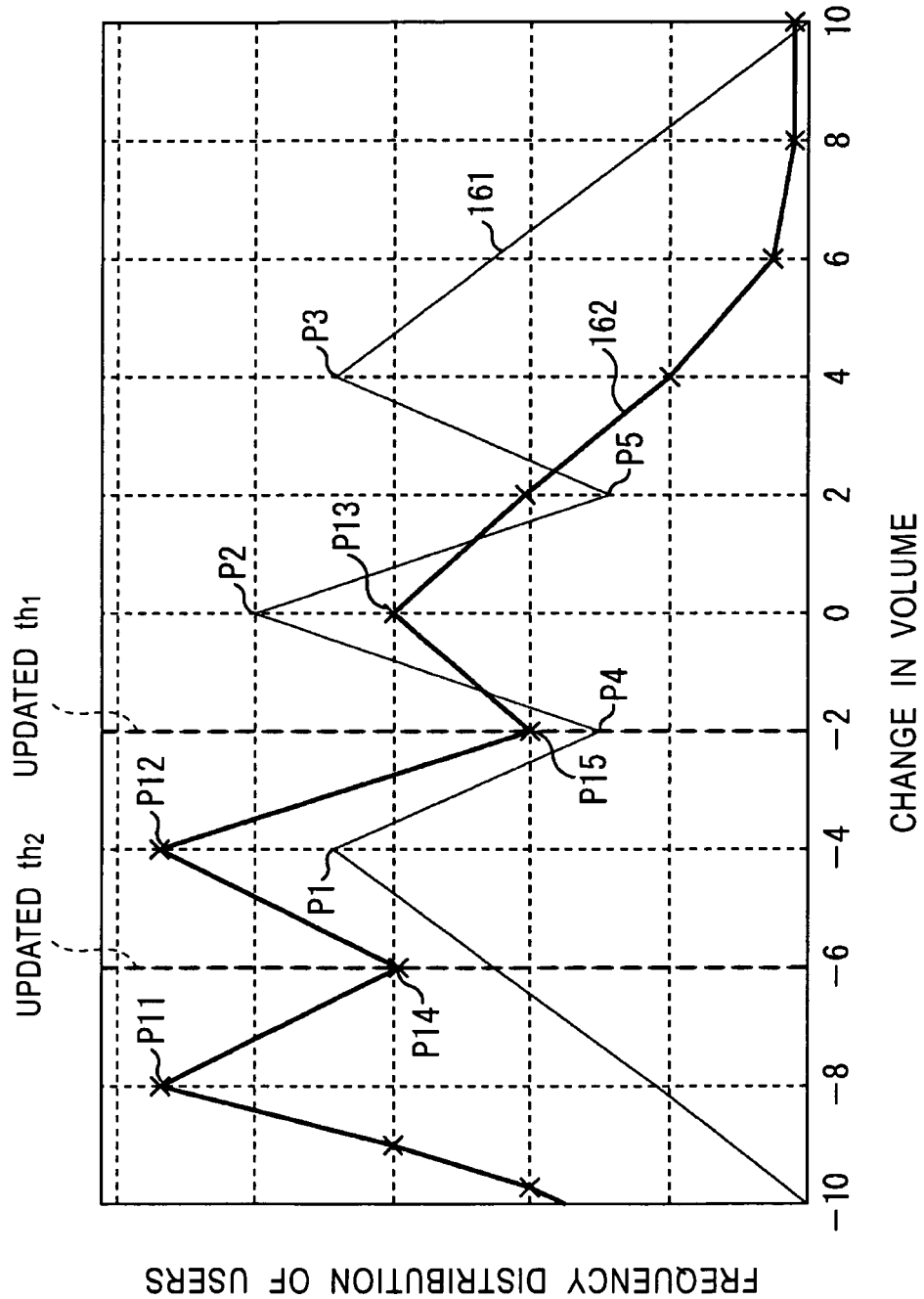
FIG. 26 is a graph showing the frequency distribution of characteristic amounts.

FIGS. 25 and 26 show examples of variation frequency distributions. Each of FIGS. 25 and 26 has a horizontal axis indicating variation in parameter Lvolume, and a vertical axis indicating a frequency distribution of users. In FIG. 22, a frequency distribution of users, initially assumed by a manufacturer, is indicated by a line 161. On the line 161, a first peak P1 is formed at a variation of −4, a second peak P2 is formed at a variation of zero, and a third peak P3 is formed at a variation of 4. Threshold $th_1$ corresponds to a minimum value P5 at a variation of 2, and threshold $th_2$ corresponds to a minimum value P4 at a variation of −2.

In other words, the manufacturer initially sets threshold $th_1$ to 2 and threshold $th_2$ to −2 so that a peak is formed toward a value less than threshold $th_2$, a peak is formed toward a value greater than threshold $th_1$, and a peak is formed toward between threshold $th_1$ and threshold $th_2$.

In step S112, when, for example, the frequency distribution indicated by the line 162 in FIG. 26 is obtained based on actually stored user information, thresholds $th_1$ and $th_2$ must be changed. On the line 162, a first peak P11 is formed at a variation of −8, a second peak P12 is formed at a variation of −4, and a third peak P13 is formed at a variation of zero.

In step S113, the selection updating unit 84 updates thresholds $th_1$ and $th_2$, as shown in FIG. 26. In FIG. 26, threshold $th_1$ is updated into a minimum value P15 at a variation of −2, and threshold $th_2$ is updated into a minimum value P14 at a variation of −6. This forms a peak on the left side of threshold $th_2$, a peak on the right side of threshold $th_1$, and a peak between thresholds $th_1$ and $th_2$.

The number of thresholds is not limited to two, but more thresholds can be set in accordance with the frequency distribution. In addition, with threshold updating, also the information recorded in the procedure database 85 is updated.

As described above, by generating a frequency distribution and setting thresholds, appropriate classification of users can be performed.

The above description uses a television receiver as an example. However, the present invention can be applied to production of other information processing apparatuses of various types.

It doesn't matter if the above-described consecutive processing is realized by hardware or software. In the case of allowing software to execute the above-described consecutive processing, programs constituting the software are installed from a network or a recording medium into a computer built into dedicated hardware or one in which various functions can be executed by installing various programs, such as a multipurpose personal computer as shown in FIG. 27.

Figure 27:
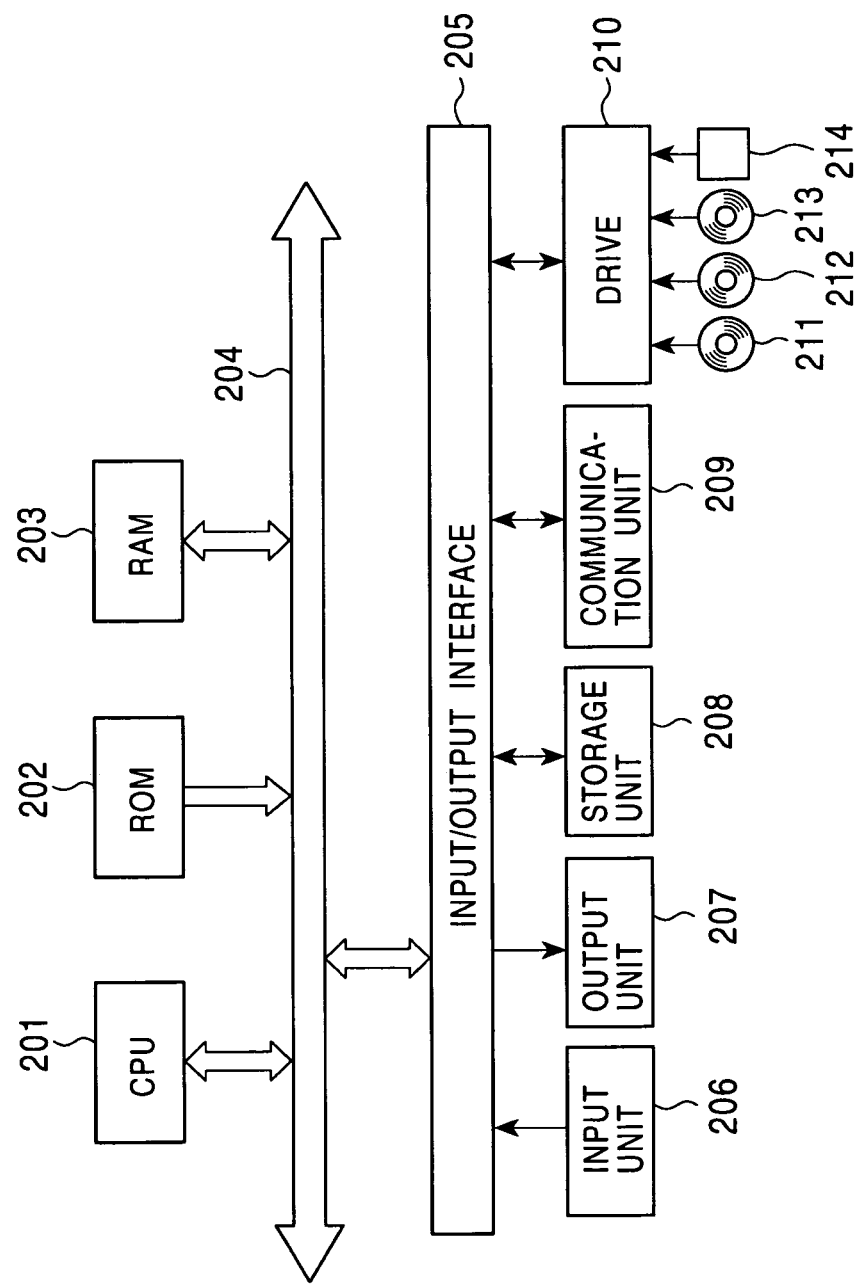
FIG. 27 is a block diagram showing an example of a personal computer.

In FIG. 27, a CPU 201 executes various processes in accordance with programs stored in a ROM 202, or programs loaded from a storage unit 208 to a RAM 203. The RAM 203 also stores the data required for the CPU 201 to execute the various processes, etc., if needed.

The CPU 201, the ROM 202, and the RAM 203 are connected to one another by a bus 204. The bus 204 also connects to an input/output interface 205.

Also, the input/output interface 205 connects to an input unit 206 including a keyboard and a mouse, a display unit (not shown) formed by a cathode ray tube, a liquid crystal display, or the like, an output unit 207 including a speaker, a storage unit 208 including a hard disk, and a communication unit 209 including a modem and a terminal adapter. The communication unit 209 performs communicating processing using a network such as the Internet.

The input/output interface 205 also connects to a drive 210, if needed. A recording medium having a program of the present invention recorded thereon is loaded into the drive 210, and a computer program read from the recording medium is installed into the storage unit 208, if needed.

The types of the recording medium include a magnetic disk 211, an optical disk 212, a magneto-optical disk 213, and a semiconductor memory 214.

The steps that execute the above-described consecutive processing include, not only processes performed in a time-series manner in described order, but also processes which are executed in parallel or separately if they are not always performed.

As described above, according to the present invention, functions matching users' preferences can be provided. In particular, it is ensured that functions that match preferences of each user can be inexpensively provided.

What is claimed is:

1. An information processing apparatus for performing predetermined image processing on an input image, comprising:
    extracting means for extracting a characteristic amount representing the characteristics of the input image;
    setting means controlled by a user to set up conditions on the image processing;
    image processing means for performing the image processing on the input image based on the conditions set by said setting means,
        wherein said image processing means performs the image processing by performing image-quality adjustment in which a resolution and a noise eliminating factor are simultaneously adjusted in accordance with the conditions set up by the user, the noise eliminating factor being automatically calculated based on the resolution set by the user; and
    storage means for storing the characteristic amount extracted by said extracting means and the conditions set by said setting means so as to be associated with each other.

2. An information processing apparatus according to claim 1, further comprising selecting means for selecting the input image,
    wherein said storage means stores selection information concerning the input image selected by said selecting means, the characteristic amount extracted by said extracting means, and the conditions set by said setting means so as to be associated with one another.

3. An information processing apparatus according to claim 1, wherein said storage means provides storage content of said storage means to a business entity via a network.

4. An information processing apparatus according to claim 1, wherein said image processing means transforms the number of pixels or transforms an interlaced image to a progressive image, and performs the image processing by enlarging the input image at a predetermined enlargement ratio.

5. An image processing method for performing predetermined image processing on an input image, comprising:
- an extracting step for extracting a characteristic amount representing the characteristics of the input image;
- a controllable setting step for setting up conditions on the image processing;
- an image processing step for performing the image processing on the input image based on the conditions set in the setting step,
  - wherein said image processing step performs the image processing by performing image-quality adjustment in which a resolution and a noise eliminating factor are simultaneously adjusted in accordance with the conditions set up by a user, the noise eliminating factor being automatically calculated based on the resolution set by the user; and
- a storage step for storing the characteristic amount extracted in the extracting step and the conditions set in the setting step so as to be associated with each other.

6. A non-transitory recording medium with a program recorded thereon, the program performing predetermined image processing on an input image, said program comprising:
- an extraction-control step for controlling extraction of a characteristic amount representing the characteristics of the input image;
- a setting-control step for controlling setting up of conditions on the image processing;
- an image-processing control step for controlling execution of the image processing on the input image based on the conditions set in the setting-control step,
  - wherein the image-processing control step controls the execution of the image processing by performing image-quality adjustment in which a resolution and a noise eliminating factor are simultaneously adjusted in accordance with the conditions set up by a user, the noise eliminating factor being automatically calculated based on the resolution set by the user; and
- a storage-control step for controlling storage of the characteristic amount extracted in the extraction-control step and the conditions set in the setting-control step.

7. A non-transitory computer-readable medium, comprising a program for performing image processing on an input image, said program comprising:
- an extraction-control step for controlling extraction of a characteristic amount representing the characteristics of the input image;
- a setting-control step for controlling setting up of conditions on the image processing;
- an image-processing control step for controlling execution of the image processing on the input image based on the conditions set in the setting-control step,
  - wherein the image-processing control step controls the execution of the image processing by performing image-quality adjustment in which a resolution and a noise eliminating factor are simultaneously adjusted in accordance with the conditions set up by a user, the noise eliminating factor being automatically calculated based on the resolution set by the user; and
- a storage-control step for controlling storage of the characteristic amount extracted in the extraction-control step and the conditions set in the setting-control step.

* * * * *